(12) United States Patent
Sinha et al.

(10) Patent No.: US 10,254,998 B2
(45) Date of Patent: Apr. 9, 2019

(54) COORDINATED GARBAGE COLLECTION OF FLASH DEVICES IN A DISTRIBUTED STORAGE SYSTEM

(71) Applicant: Samsung Electronics Co., Ltd., Suwon-si, Gyeonggi-do (KR)

(72) Inventors: Vikas Sinha, Sunnyvale, CA (US); Zvi Guz, Palo Alto, CA (US); Gunneswara Rao Marripudi, Fremont, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/046,435

(22) Filed: Feb. 17, 2016

(65) Prior Publication Data

US 2017/0123718 A1 May 4, 2017

Related U.S. Application Data

(60) Provisional application No. 62/250,421, filed on Nov. 3, 2015.

(51) Int. Cl.
*G06F 3/06* (2006.01)
*G06F 12/02* (2006.01)

(52) U.S. Cl.
CPC ............ *G06F 3/0652* (2013.01); *G06F 3/067* (2013.01); *G06F 3/0608* (2013.01); *G06F 3/0617* (2013.01); *G06F 3/0653* (2013.01); *G06F 3/0688* (2013.01); *G06F 12/0246* (2013.01); *G06F 2212/1041* (2013.01); *G06F 2212/7205* (2013.01)

(58) Field of Classification Search
CPC .... G06F 3/0608; G06F 3/0652; G06F 3/0653; G06F 3/0688; G06F 3/067
See application file for complete search history.

(56) References Cited

U.S. PATENT DOCUMENTS

| | | | | |
|---|---|---|---|---|
| 5,530,850 A | * | 6/1996 | Ford | ..................... G06F 3/0601 707/813 |
| 5,857,210 A | * | 1/1999 | Tremblay | ............ G06F 12/0269 |
| 7,743,276 B2 | | 6/2010 | Jacobson et al. | |

(Continued)

*Primary Examiner* — Ramon A. Mercado
(74) *Attorney, Agent, or Firm* — Renaissance IP Law Group LLP

(57) ABSTRACT

A distributed storage system can include a storage node (125, 130, 135). The storage node (125, 130, 135) can include a Solid State Drive (SSD) or other storage device that employs garbage collection (140, 145, 150, 155, 160, 165, 225, 230), a device garbage collection monitor (205), a garbage collection coordinator (210), an Input/Output (I/O) redirector (215), and an I/O resynchronizer (220). The device garbage collection monitor (205) can determine whether any storage devices (140, 145, 150, 155, 160, 165, 225, 230) need to perform garbage collection. The garbage collection coordinator (210) can schedule when the storage device (140, 145, 150, 155, 160, 165, 225, 230) can perform garbage collection. The I/O redirector (215) can redirect read requests (905) and write requests (1005) away from the storage device (140, 145, 150, 155, 160, 165, 225, 230) when it is performing garbage collection. The I/O resynchronizer (220) can ensure that data on the storage device (140, 145, 150, 155, 160, 165, 225, 230) is up-to-date after garbage collection finishes.

19 Claims, 22 Drawing Sheets

(56) References Cited

U.S. PATENT DOCUMENTS

| | | | | |
|---|---|---|---|---|
| 8,521,972 | B1* | 8/2013 | Boyle | G06F 12/0246 711/103 |
| 8,527,544 | B1* | 9/2013 | Colgrove | G06F 3/0608 707/791 |
| 8,560,759 | B1* | 10/2013 | Boyle | G06F 12/0246 711/101 |
| 8,713,268 | B2 | 4/2014 | Dillow et al. | |
| 8,788,778 | B1* | 7/2014 | Boyle | G06F 12/0253 711/155 |
| 8,886,691 | B2 | 11/2014 | Colgrove et al. | |
| 9,229,854 | B1* | 1/2016 | Kuzmin | G06F 12/0246 |
| 2010/0077136 | A1* | 3/2010 | Ware | G06F 12/0246 711/103 |
| 2010/0318584 | A1* | 12/2010 | Krishnaprasad | G06F 12/0806 707/813 |
| 2011/0047356 | A2 | 2/2011 | Flynn et al. | |
| 2011/0145475 | A1* | 6/2011 | Eleftheriou | G06F 12/0246 711/103 |
| 2012/0036309 | A1* | 2/2012 | Dillow | G06F 11/108 711/103 |
| 2013/0159815 | A1* | 6/2013 | Jung | G06F 11/10 714/773 |
| 2013/0173954 | A1* | 7/2013 | Woo | G06F 11/167 714/6.13 |
| 2013/0232310 | A1* | 9/2013 | Kruus | G06F 12/16 711/162 |
| 2014/0215129 | A1* | 7/2014 | Kuzmin | G06F 12/0246 711/103 |
| 2014/0379965 | A1* | 12/2014 | Gole | G06F 12/0246 711/103 |
| 2015/0026514 | A1* | 1/2015 | Benhase | G06F 11/2066 714/6.23 |
| 2015/0222705 | A1* | 8/2015 | Stephens | G06F 3/0611 709/214 |
| 2015/0347025 | A1* | 12/2015 | Law | G06F 3/0611 711/103 |
| 2016/0011815 | A1* | 1/2016 | Klein | G06F 3/0644 714/6.12 |
| 2016/0080490 | A1* | 3/2016 | Verma | H04L 67/1097 709/217 |
| 2016/0124847 | A1* | 5/2016 | Malwankar | G06F 12/0253 711/103 |
| 2016/0179410 | A1* | 6/2016 | Haas | G06F 3/0619 714/6.24 |
| 2016/0306822 | A1* | 10/2016 | Waghulde | G06F 17/30212 |
| 2017/0046256 | A1* | 2/2017 | Horspool | G06F 12/0253 |
| 2017/0052719 | A1* | 2/2017 | Boitei | G06F 3/0619 |

* cited by examiner

| | | Map | | |
|---|---|---|---|---|
| | Count | Location 1 | Location 2 | Location 3 |
| A, 0 _1403_ | 3 _1415_ | 0, 0x100000 _1427_ | 1, 0x200000 _1430_ | 2, 0x100000 _1433_ |
| A, 1 _1406_ | 3 _1418_ | 0, 0x101000 _1436_ | 1, 0x202000 _1439_ | 3, 0x100000 _1442_ |
| A, 2 _1409_ | 3 _1421_ | 0, 0x102000 _1445_ | 1, 0x203000 _1448_ | 3, 0x101000 _1451_ |
| B, 0 _1412_ | 2 _1424_ | 1, 0x100000 _1454_ | 2, 0x101000 _1457_ | _1460_ |
| ... | ... | ... | ... | ... |

COORDINATED GARBAGE COLLECTION OF FLASH DEVICES IN A DISTRIBUTED STORAGE SYSTEM

RELATED APPLICATION DATA

This application claims the benefit of U.S. Provisional Patent Application Ser. No. 62/250,421, filed Nov. 3, 2015, which is hereby incorporated by reference.

FIELD

This inventive concept relates to distributed storage systems, and more particularly to performing garbage collection on Solid State Drives (SSDs) in distributed storage systems.

BACKGROUND

Distributed storage systems such as Ceph, use data replication and/or erasure coding to ensure data availability across drive and storage node failures. Such distributed storage systems can use Solid State Drives (SSDs). SSDs have advantages over more traditional hard disk drives in that data access is faster and not dependent on where data might reside on the drive.

SSDs read and write data in units of a page. That is, to read any data, a whole page is accessed; to write any data, an entire page is written to an available page on the SSD. But when data is written, it is written to a free page: existing data is not overwritten. Thus, as data is modified on the SSD, the existing page is marked as invalid and a new page is written to the SSD. Thus, pages in SSDs have one of three states: free (available for use), valid (storing data), and invalid (no longer storing valid data).

Over time, invalid pages accumulate on the SSD and need to have their states changed to free. But SSDs erase data in units of blocks (which include some number of pages) or superblocks (which include some number of blocks). If the SSD were to wait until all the pages in the erase block or superblock were invalid before attempting to erase a block or superblock, the SSD would likely fill up and reach a state wherein no blocks were free and none could be freed. Thus, recovering invalid pages can involve moving valid pages from one block to another, so that an entire block (or superblock) can be erased.

Erasing blocks or superblocks is time-consuming, relative to the time required to perform reads or writes. Further, part or all of the SSD can be unavailable when a block or superblock is being erased. Thus, it can be important to manage when SSDs perform garbage collection. If all SSDs in a distributed storage system were to perform garbage collection at the same time, for example, no data requests could be serviced, rendering the distributed storage system no better (albeit temporarily) than a system with data stored locally and undergoing garbage collection.

A need remains for a way to minimize the impact of garbage collection operations on a distributed storage system.

BRIEF DESCRIPTION OF THE DRAWINGS

FIG. 14 shows an example of the map of data in FIG. 13, stored in the monitor of FIG. 1.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Figure 1:
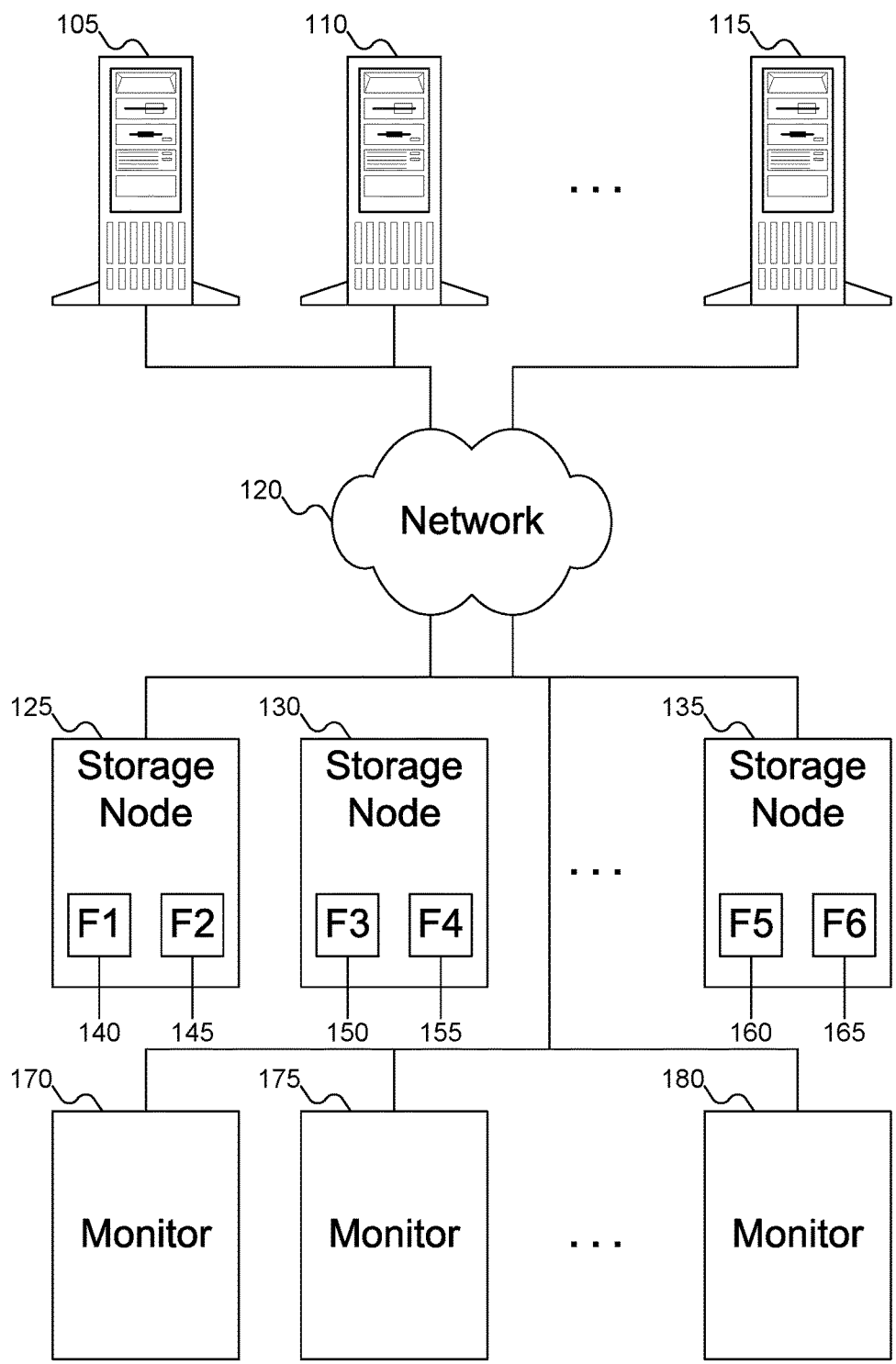
FIG. 1 shows a distributed storage system, according to an embodiment of the inventive concept.

FIG. 1 shows a distributed storage system, according to an embodiment of the inventive concept. In FIG. 1, clients 105, 110, and 115 are shown, in communication with network 120. Clients 105, 110, and 115 can be any desired types of devices, including desktop computers, notebook computers, tablet computers, servers, smartphones, and the like. In addition, while FIG. 1 shows three clients 105, 110, and 115, embodiments of the inventive concept can support any number of clients.

Network 120 can be any variety of network, including a Local Area Network (LAN), a Wide Area Network (WAN), or a global network, such as the Internet. Network 120 can also include multiple different varieties of networks in combination. For example, network 120 can include multiple LANs that can communicate with each other across a global network using a Virtual Private Network (VPN) to secure the communications.

Also connected to network 120 are storage nodes 125, 130, and 135. Each storage node 125, 130, and 135 provides storage for the distributed network. Each storage node 125, 130, and 135 can include various storage devices, such as flash drives (also called Solid State Drives, or SSDs) 140 and 145 in storage node 125, flash drives 150 and 155 in storage node 130, and flash drives 160 and 165 in storage node 135. Although FIG. 1 shows three storage nodes 125, 130, and 135, embodiments of the inventive concept can support any number of storage nodes. In addition, while FIG. 1 shows each storage node 125, 130, and 135 supporting two flash drives, embodiments of the inventive concept can support any number of flash drives in each storage node 125, 130, and 135. Storage nodes 125, 130, and 135 can also include storage devices of other types, such as traditional hard disk drives, that might or might not benefit from coordinated garbage collection. For example, traditional hard disk drives occasionally require defragmentation to combine scattered portions of files. Defragmentation can be a time-consuming operation, and might benefit from coordination just like garbage collection on flash drives. Storage nodes 125, 130, and 135 are discussed further with reference to FIGS. 2-3 and 5-12 below.

Also connected to network 120 are monitors (also called monitor nodes) 170, 175, and 180. Monitors 170, 175, and 180 are responsible for keeping track of cluster configuration and notifying entities of changes in the cluster configuration. Examples of such changes can include the addition or subtraction of storage nodes, changes in the availability of storage on the storage nodes (such as the addition or subtraction of a flash drive), and so on. Note that "changes" in this context is not limited to intentional action taken to change the distributed storage system. For example, if a network connection goes down, taking storage node 125 out of the distributed storage system, that action changes the cluster configuration in a manner that would be processed by monitors 170, 175, and 180, even though the storage node might still be operating and attempting to communicate with the rest of the distributed storage system. Monitors 170, 175, and 180 are discussed further with reference to FIGS. 4, 8, and 13 below.

While the rest of the discussion below focuses on SSDs, embodiments of the inventive concept can be applied to any storage devices that implement garbage collection in a manner similar to SSDs. Any reference to SSD below is also intended to encompass other storage devices that perform garbage collection.

Figure 2:
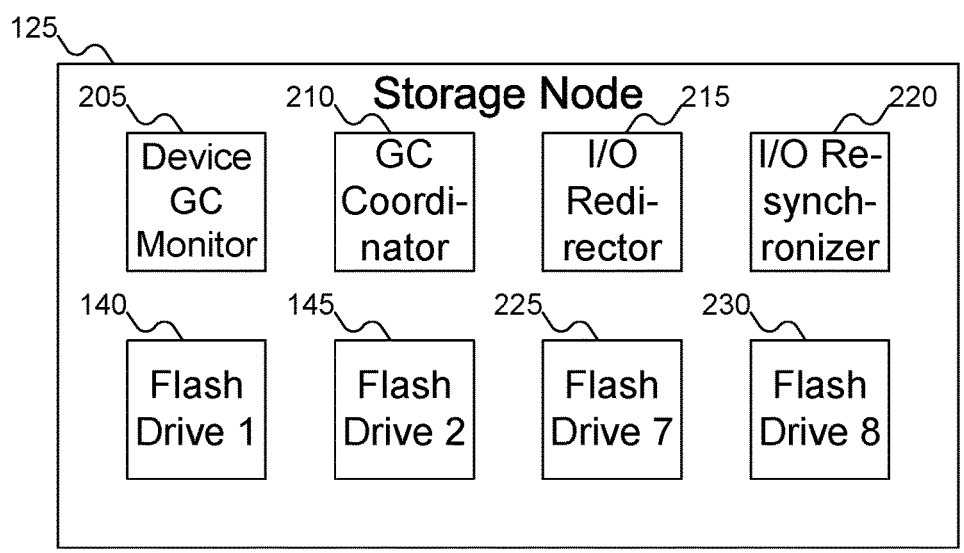
FIG. 2 shows details of the storage node of FIG. 1.

FIG. 2 shows details of storage node 125 of FIG. 1. In FIG. 2, storage node 125 is shown in detail; storage nodes 130 and 135 can be similar. Storage node 125 is shown as including device garbage collection monitor 205, garbage collection coordinator 210, Input/Output (I/O) redirector 215, I/O resynchronizer 220, and four flash drives 140, 145, 225, and 230. Device garbage collection monitor 205 can determine which flash drives need to perform garbage collection, and can estimate how long a flash drive will require to perform garbage collection. Garbage collection coordinator 210 can communicate with one or more of monitors 170, 175, and 180 of FIG. 1 to schedule garbage collection for the selected flash drive, and can instruct the selected flash drive when to perform garbage collection and how long the selected flash drive has for garbage collection. I/O redirector 215 can redirect read and write requests destined for the selected flash drive while it is performing garbage collection. And I/O resynchronizer 220 can bring the flash drive up to date with respect to data changes after garbage collection has completed.

Figure 3:
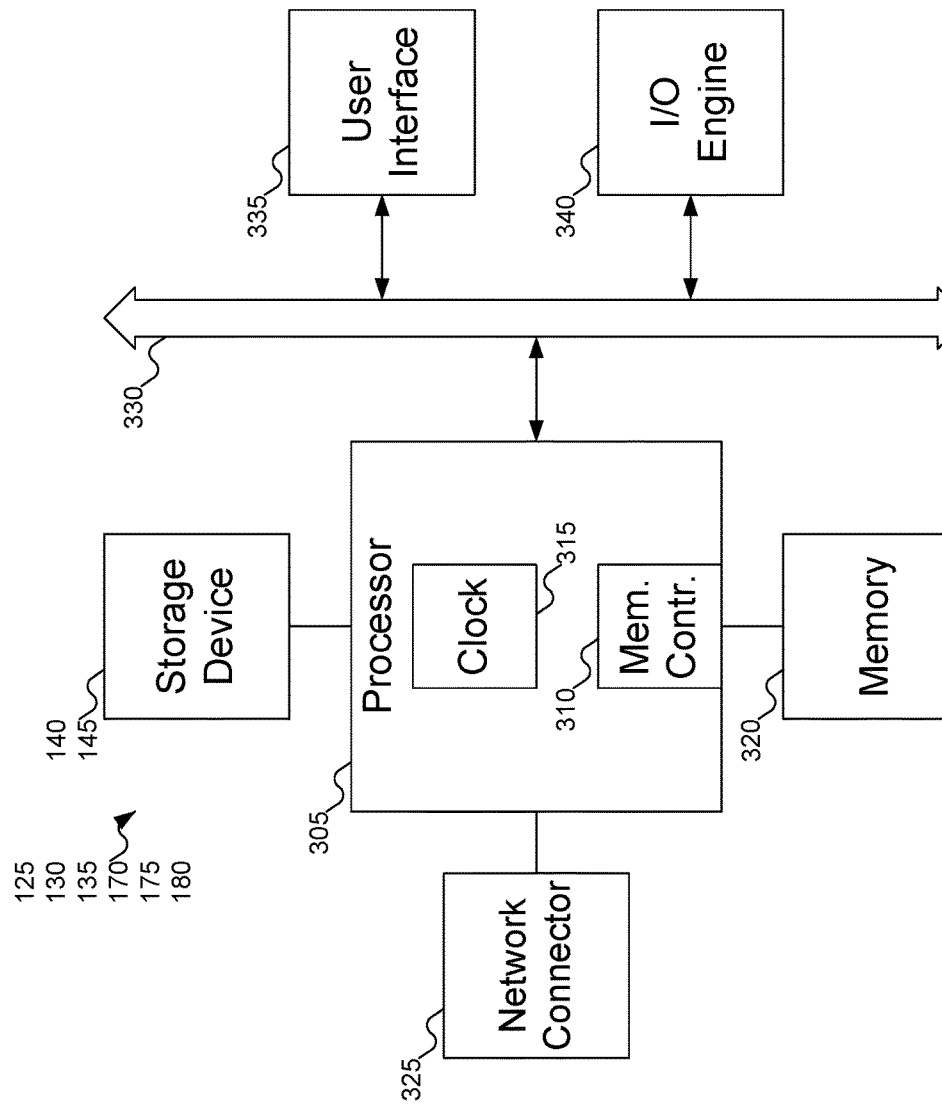
FIG. 3 shows further details of the storage node of FIG. 1.

FIG. 3 shows further details of storage node 125 of FIGS. 1-2. In FIG. 3, typically, storage node 125 can include one or more processors 305, which can include memory controller 310 and clock 315, which can be used to coordinate the operations of the components of storage node 125. Processors 305 can also be coupled to memory 320, which can include random access memory (RAM), read-only memory (ROM), or other state preserving media, as examples. Processors 305 can also be coupled to storage devices 140 and 145, and network connector 325, which can be, for example, an Ethernet connector. Processors 305 can also be connected to a bus 330, to which can be attached user interface 335 and input/output interface ports that can be managed using input/output engine 340, among other components.

Figure 4:
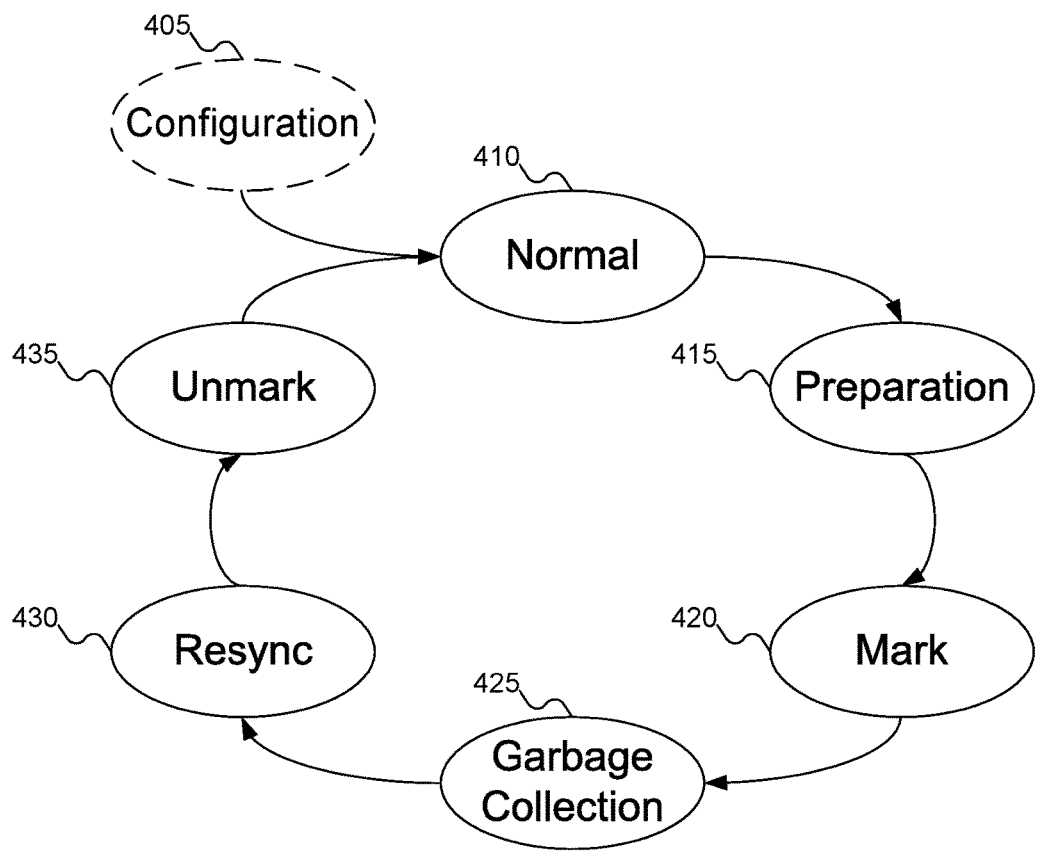
FIG. 4 shows phases that a Solid State Drive (SSD) can be in during use of the distributed storage system of FIG. 1.

FIG. 4 shows phases that a Solid State Drive (SSD) can be in during use of the distributed storage system of FIG. 1. In FIG. 4, SSDs begin at configuration phase 405. In configuration phase 405, the SSDs can be configured to only perform garbage collection upon instruction from storage node 125 of FIGS. 1-2. Configuration phase 405 is optional, as shown by the dashed lines: some SSDs do not support configuration, or the distributed storage system might opt not to configure the SSDs even though they could be configured. Then in normal phase 410, the SSDs operate normally, responding to read and write requests as delivered.

When an SSD needs to perform garbage collection, the SSD can enter preparation phase 415. Preparation phase 415 can include determining when the SSD will perform garbage collection and how much time the SSD will have for garbage collection. Note that in preparation phase 415, the SSD can still process read and write requests as normal. Then, at the appropriate time, the SSD can enter mark phase 420. In mark phase 420, monitors 170, 175, and 180 of FIG. 1 can mark the SSD as performing garbage collection, and therefore unavailable. The SSD can then enter garbage collection phase 425, wherein the SSD can perform garbage collection.

When the SSD completes garbage collection, or when the time allotted for garbage collection expires, the SSD can enter resync phase 430. In resync phase 430, the SSD can be updated with respect to data changes that affect the SSD. After resync phase 430 is complete, the SSD can enter unmark phase 435, wherein monitors 170, 175, and 180 of FIG. 1 can mark the SSD as available again (i.e., reversing the operations in mark phase 420). Finally, the SSD can return to normal phase 410, and can process read and write requests as normal.

Figure 5:
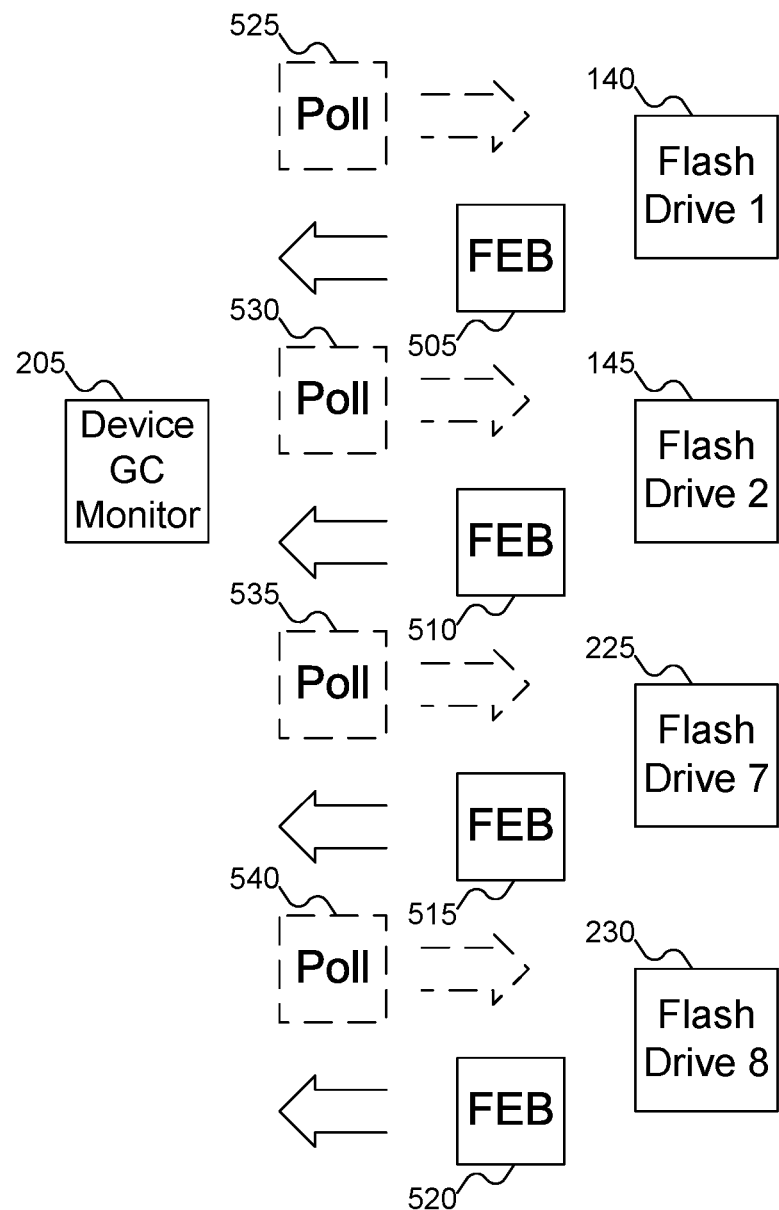
FIG. 5 shows the device garbage collection monitor of FIG. 2 receiving free erase block counts from the SSDs of FIGS. 1-2.

FIG. 5 shows the device garbage collection monitor of FIG. 2 receiving free erase block counts from the SSDs of FIGS. 1-2. In FIG. 5, device garbage collection monitor 205 is shown interacting with flash drives 140, 145, 225, and 230 of storage node 125 of FIG. 1. Typically, device garbage collection monitor 205 only interacts with storage devices on the storage node including device garbage collection monitor 205. But embodiments of the inventive concept can have device garbage collection monitor 205 interacting with storage devices on other storage nodes.

Device garbage collection monitor 205 can periodically receive free erase block counts 505, 510, 515, and 520 from flash drives 140, 145, 225, and 230, respectively. Free erase block counts 505, 510, 515, and 520 can represent the number or percentage of blocks (or superblocks) currently free on each of flash drives 140, 145, 225, and 230. Relative to the total number of blocks available on the SSD, the free erase block count can be a good indicator of how full the SSD is. As the free erase block count drops, the SSD is filling up, and garbage collection might be needed to increase the number of free erase blocks.

In some embodiments of the inventive concept, flash drives 140, 145, 225, and 230 send free erase block counts 505, 510, 515, and 520 to device garbage collection monitor 205 automatically. In other embodiments of the inventive concept, device garbage collection monitor 205 can query flash drives 140, 145, 225, and 230 when it wants to know their free erase block counts 505, 510, 515, and 520. These queries are shown as polls 525, 530, 535, and 540, respectively. Because not all embodiments of the inventive concept have device garbage collection monitor 205 interrogating flash drives 140, 145, 225, and 230 for their free erase block counts 505, 510, 515, and 520, polls 525, 530, 535, and 540 are shown with dashed lines.

Flash drives 140, 145, 225, and 230 can return more than just free erase block counts 505, 510, 515, and 520 to device garbage collection monitor 205. For example, flash drives 140, 145, 225, and 230 can indicate to device garbage collection monitor that they need to perform static wear leveling. In brief, data cells in an SSD can perform only so many write and erase operations before the data cells begin to fail: the manufacturer of the SSD knows on average how many write and erase operations a data cell can take. SSDs can use static wear leveling to attempt to keep the number of write and erase operations fairly consistent across all data cells, hopefully avoiding a premature failure of the SSD due to excessive use of a small number of data cells.

Figure 6:
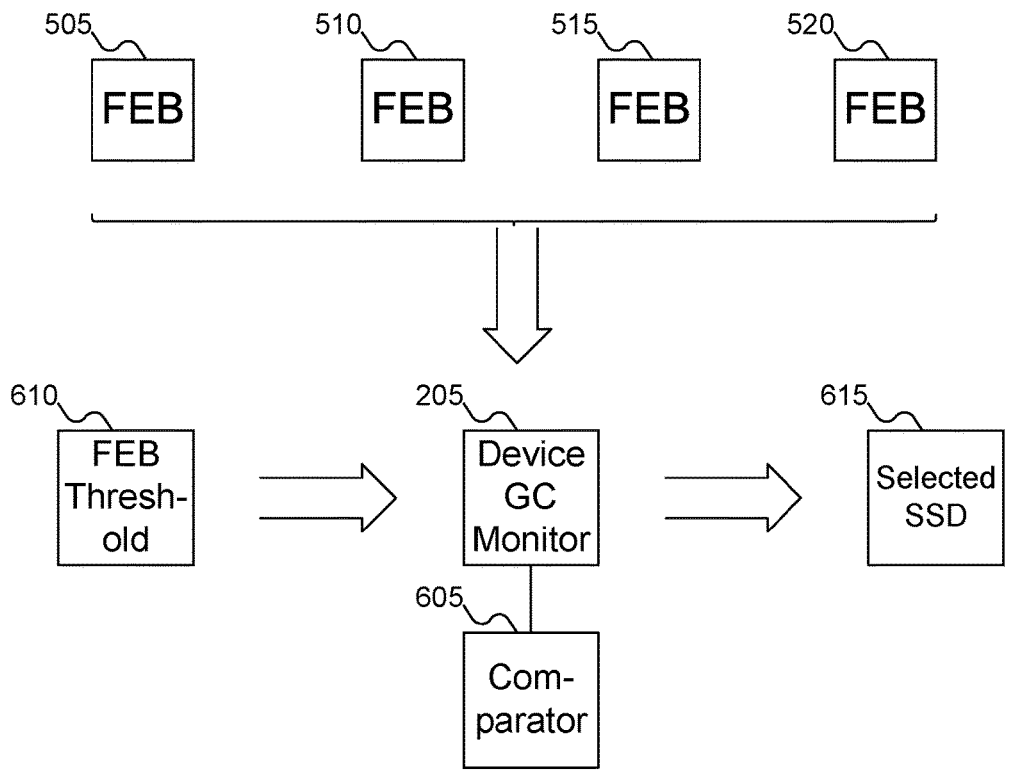
FIG. 6 shows the device garbage collection monitor of FIG. 2 selecting an SSD for garbage collection based on the free erase block counts of FIG. 5 from the SSDs of FIGS. 1-2.

FIG. 6 shows device garbage collection monitor 205 of FIG. 2 selecting an SSD for garbage collection based on free erase block counts 505, 510, 515, and 520 of FIG. 5 from the SSDs of FIGS. 1-2. In FIG. 6, device garbage collection monitor 205 can use comparator 605 to compare free erase block counts 505, 510, 515, and 520 with free erase block threshold 610. If any of free erase block counts 505, 510, 515, and 520 are below free erase block threshold 610, then the SSD providing that free erase block count can become selected SSD 615 for garbage collection.

While FIG. 6 shows a single free erase block threshold 610, embodiments of the inventive concept can support multiple free erase block thresholds 610. That is, comparator 605 can compare free erase block counts 505, 510, 515, and 520 with different free erase block thresholds 610, depending on the flash drive in question. In this manner, embodiments of the inventive concept recognize that SSDs can have different block sizes and counts, and therefore have different thresholds representing how full the flash drive is.

In some embodiments of the inventive concept, free erase block threshold 610 can be a fixed number. For example, consider an SSD with a total capacity of 512 GB and a block size of 2048 KB. Such an SSD has 250,000 blocks. Such an SSD might have free erase block threshold 610 set to 50,000. On the other hand, an SSD with a capacity of 256 GB and a block size of 512 KB would have 500,000 blocks, and could have the free erase block threshold set to 100,000.

In other embodiments of the inventive concept, free erase block threshold 610 can be a percentage, such as 20%. That is, when an SSD has a free erase block count that is less than 20% of its total number of blocks, that SSD needs to perform garbage collection. Note that setting free erase block threshold 610 to 20% (rather than to a fixed number) would cover both example SSDs described above, which would require different free erase block thresholds when using fixed numbers of blocks.

Figure 7:
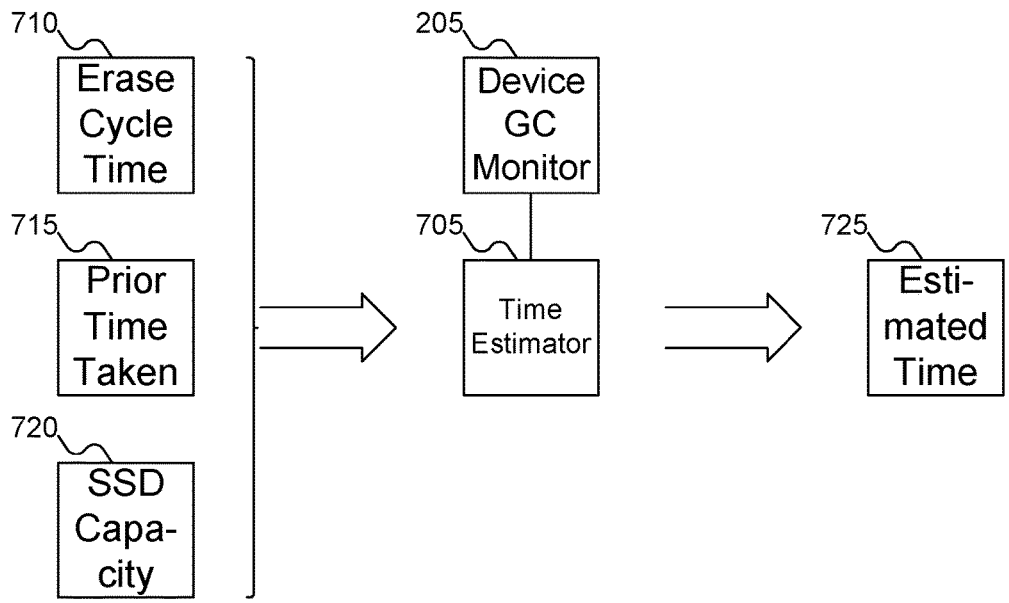
FIG. 7 shows the device garbage collection monitor of FIG. 2 estimating the time required to perform garbage collection on the SSD selected in FIG. 6.

FIG. 7 shows device garbage collection monitor 205 of FIG. 2 estimating the time required to perform garbage collection on selected SSD 615 of FIG. 6. In FIG. 7, device garbage collection monitor 205 can include time estimator 705. Time estimator 705 can estimate the time required to perform the garbage collection on selected SSD 615 of FIG. 6.

Time estimator 705 can use various data to estimate the time required to perform garbage collection on selected SSD 615 of FIG. 6. These data can include erase cycle time 710—the time required to erase a block on selected SSD 615 of FIG. 6, prior time taken 715—the time required by selected SSD 615 of FIG. 6 to perform garbage collection the last time selected SSD 615 of FIG. 6 performed garbage collection, and SSD capacity 720—the total capacity of selected SSD 615 of FIG. 6. Time estimator 705 can also use the number of blocks to be erased on selected SSD 615 of FIG. 6, if this number is known. These data provide a decent (if not perfect) estimate of how long selected SSD 615 of FIG. 6 would take to perform garbage collection.

Figure 8:
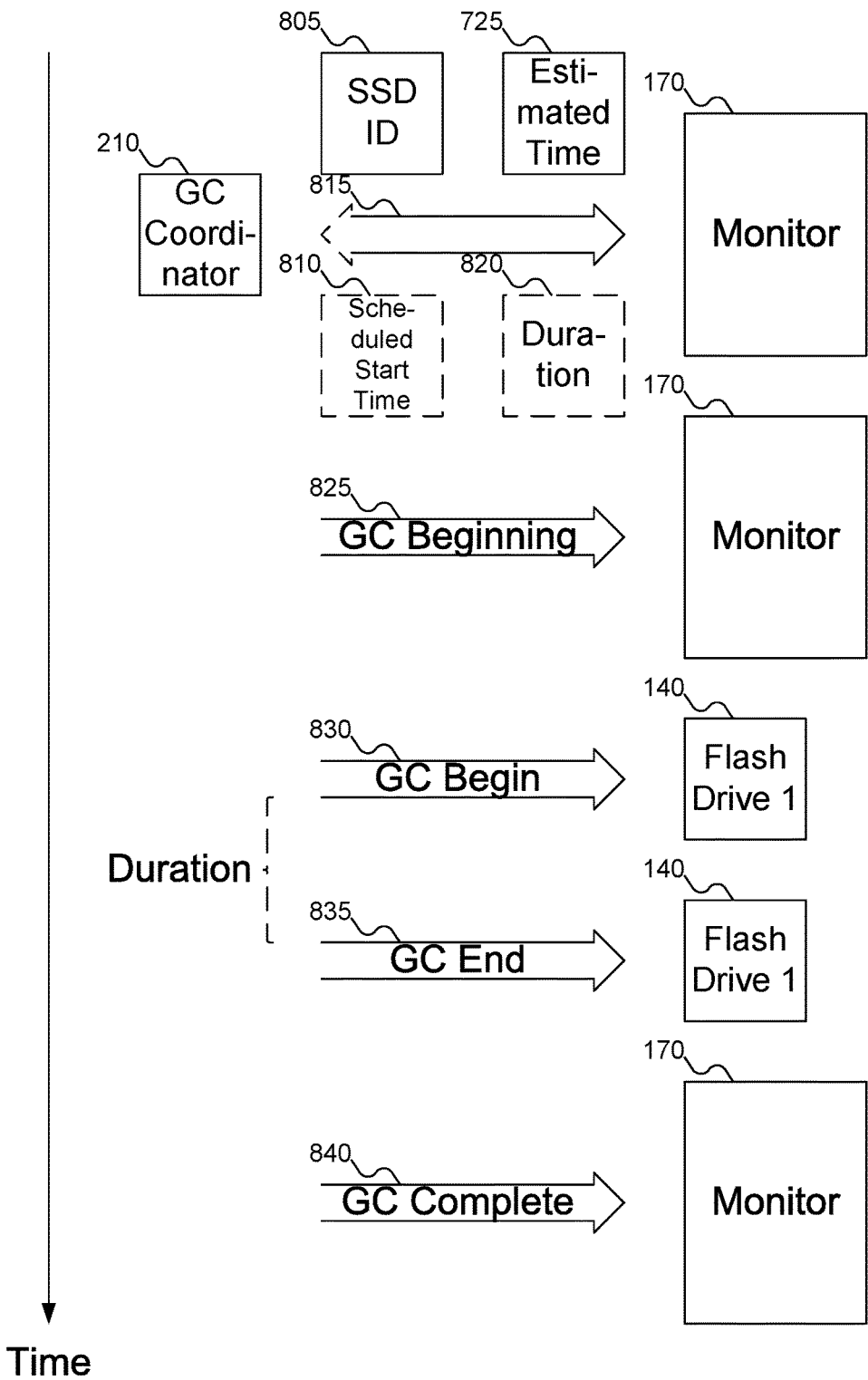
FIG. 8 shows the garbage collection coordinator of FIG. 2 interacting with a monitor of FIG. 1 to schedule and perform garbage collection on the SSD selected in FIG. 6.

FIG. 8 shows garbage collection coordinator 210 of FIG. 2 interacting with monitor 170 of FIG. 1 to schedule and perform garbage collection on selected SSD 615 of FIG. 6. In FIG. 8, garbage collection coordinator 210 can send identifier 805 of selected SSD 615 of FIG. 6, along with estimated time 725 required to perform garbage collection on selected SSD 615 of FIG. 6, to monitor 170. Garbage collection coordinator 210 can also send selected start time 810, which can be selected by garbage collection coordinator, to monitor 170. Monitor 170 can then use this information to be aware of garbage collection on selected SSD 615 of FIG. 6. This exchange of information is shown as exchange 815.

There are different models of how monitor 170 can operate. In one model, called GC with Acknowledgment, monitor 170 (possibly in coordination with the other monitors in the distributed storage system) can decide when each SSD performs garbage collection, and how long the SSD can spend on garbage collection. In this model, garbage collection coordinator 210 does not instruct selected SSD 615 to begin garbage collection until monitor 170 notifies garbage collection coordinator 210 as to when selected SSD 615 of FIG. 6 can perform garbage collection and how long selected SSD 615 of FIG. 1 has to perform garbage collection. That is, until monitor 170 informs garbage collection coordinator 210 about when to perform garbage collection, selected SSD 615 of FIG. 6 remains in normal phase 410 of FIG. 4.

In embodiments of the inventive concept using GC with Acknowledgement, scheduled start time 810 selected by garbage collection coordinator 210 and estimated time 725 are not binding. Only scheduled start time 810 and duration 820 as assigned by monitor 170 are to be used. The information sent by garbage collection coordinator 210 is merely a suggestion to monitor 170.

In embodiments of the inventive concept using GC with Acknowledgement, monitor 170 (possibly in coordination with the other monitors in the distributed storage system) can schedule each SSD requiring garbage collection to minimize the impact of garbage collection on clients 105, 110, and 115 of FIG. 1. For example, if two different SSDs each want to perform garbage collection, monitor 170 can prioritize which SSD can perform garbage collection first, letting the other SSD wait. In this manner, with only one SSD performing garbage collection at any time, the likelihood that a data request cannot be serviced by any SSD is reduced.

In other embodiments of the inventive concept, monitor 170 can operate in a model called GC with No Acknowledgment. In this model, monitor 170 can track when SSDs are performing garbage collection, but monitor 170 does not respond or change scheduled start time 810 as selected by garbage collection coordinator and estimated time 725. In embodiments of the inventive concept using GC with No Acknowledgement, it can happen that multiple SSDs can perform garbage collection at the same time. But if the level of redundancy of the data in the distributed storage system is sufficient, the likelihood that a data request will be delayed until an SSD completes its garbage collection is minimal. For example, if the distributed storage system includes three copies of each unit of data, the likelihood that all three copies will be unavailable when requested by client 105 of FIG. 1 might be sufficiently small as to be acceptable.

There is a mathematical relationship between the number of copies of each unit of data and the likelihood that there will be no available copies at any time (along with other variables, such as how often garbage collection occurs on an SSD or how long garbage collection takes). Given a desired degree of reliability (that is, that at least one copy of each unit of data is likely available at any time), the number of copies of each unit of data can be calculated to provide that desired degree of reliability.

Regardless of whether GC with Acknowledgement or GC with No Acknowledgement is used, eventually garbage collection coordinator 210 can inform monitor 170 that garbage collection is beginning on flash drive 140, as shown by GC Beginning message 825. Garbage collection coordinator 230 can also instruct flash drive 140 to begin garbage collection, as shown by GC Begin instruction 830. Eventually, after duration 820 has passed, garbage collection coordinator 210 can instruct flash drive 140 to end garbage collection, as shown by GC End instruction 835. Finally, garbage collection coordinator 210 can inform monitor 170 that garbage collection has completed on flash drive 140, as shown by GC Complete message 840.

Note that embodiments of the inventive concept do not require all the messages shown in FIG. 8. As described above, in embodiments of the inventive concept using GC with No Acknowledgement, monitor 170 does not send any reply to garbage collection coordinator 170. Further, as monitor 170 is aware of when garbage collection is scheduled to begin and end, garbage collection coordinator can omit messages 825 and 840 to monitor 170. And instruction 835 is only useful if flash drive 140 permits garbage collection to be interrupted: if garbage collection cannot be interrupted on flash drive 140, then flash drive 140 would not process instruction 835. But if flash drive 140 does not permit garbage collection to be interrupted via instruction 835, then message 840 might be necessary, to inform monitor 170 when flash drive 140 has completed garbage collection. For example, consider the scenario where flash drive 140 does not permit garbage collection to be interrupted, but duration 820 is less than the time required to perform garbage collection on flash drive 140. If monitor 170 assumes that flash drive 140 has completed garbage collection after duration 820 has passed, monitor 170 might think that flash drive 140 is available when it is not, which could result in data requests being delayed while multiple SSDs perform garbage collection simultaneously.

Figure 9A:
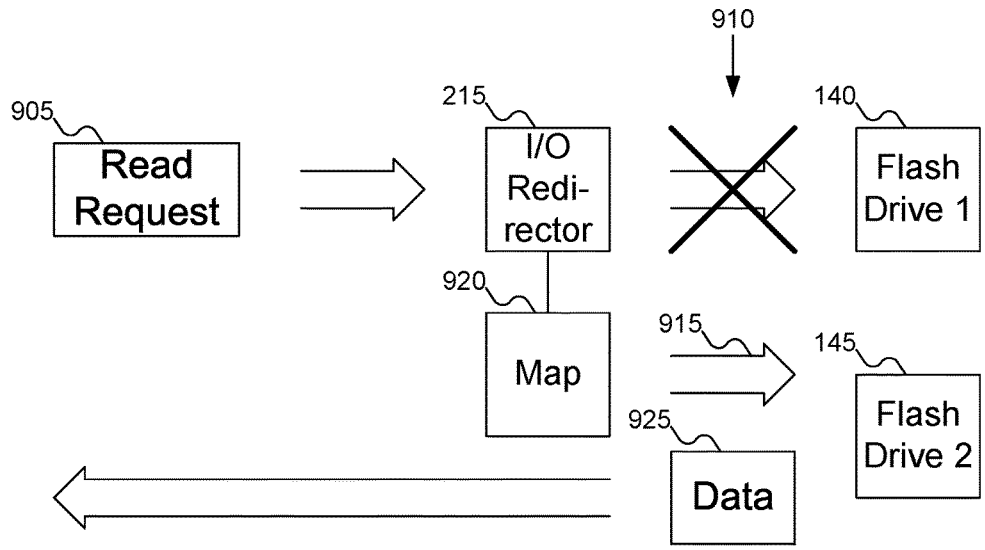
FIGS. 9A-9B show the Input/Output (I/O) redirector of FIG. 2 processing read requests for the SSD selected in FIG. 6, according to embodiments of the inventive concept.
Figure 9B:
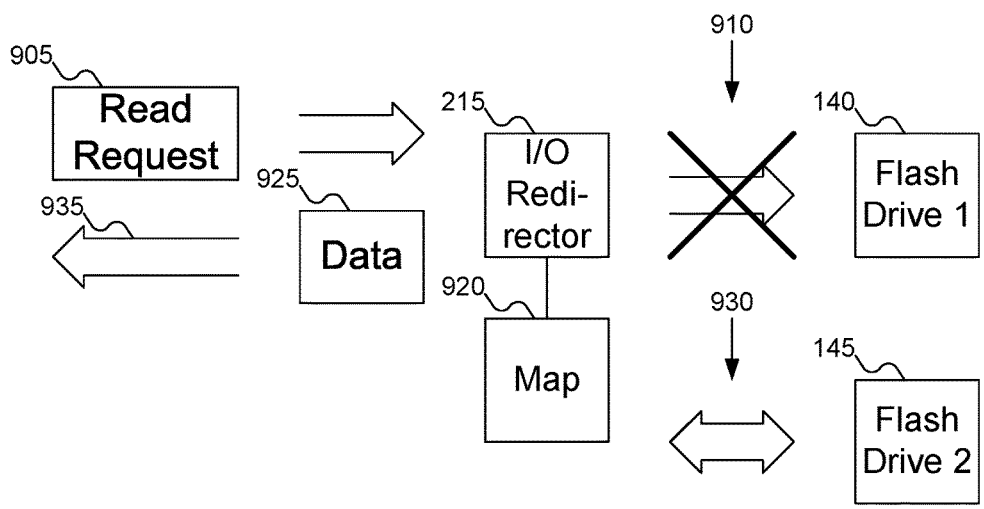

FIGS. 9A-9B show Input/Output (I/O) redirector 215 of FIG. 2 processing read requests for selected SSD 615 of FIG. 6, according to embodiments of the inventive concept. In FIG. 9A, in some embodiments of the inventive concept, I/O redirector 215 can receive read request 905, destined for flash drive 140. But if flash drive 140 is performing garbage collection, letting read request 905 be delivered to flash drive 140 can result in a delay in returning the requested data. Thus, I/O redirector 215 can cancel the delivery of read request 905 to flash drive 140 (as shown by canceled arrow 910), and instead can redirect read request to flash drive 145 (as shown by arrow 915). I/O redirector 215 can use map 920, which can be stored locally or accessed from monitor 170 of FIG. 1, to determine which storage devices on the distributed storage system store other copies of the requested data. I/O redirector 215 can then redirect read request 905 to an appropriate device, such as flash drive 145. Flash drive 145 can then access data 925 and return it directly to the requesting client.

In FIG. 9B, in other embodiments of the inventive concept, I/O redirector 215 can intercept read request 905 destined for flash drive 140, which is performing garbage collection. But instead of redirecting read request 905 to flash drive 145, I/O redirector 215 can make its own request for the data from flash drive 145 in exchange 930. Flash drive 145 can then return data 925 to I/O redirector 215 in exchange 930, which can then return data 925 to the requesting client in message 935. In the embodiments of the inventive concept shown in FIG. 9B, the requesting client does not receive data from an unexpected source, which might confuse the requesting client if the requesting client is not prepared for this possibility.

Figure 10:
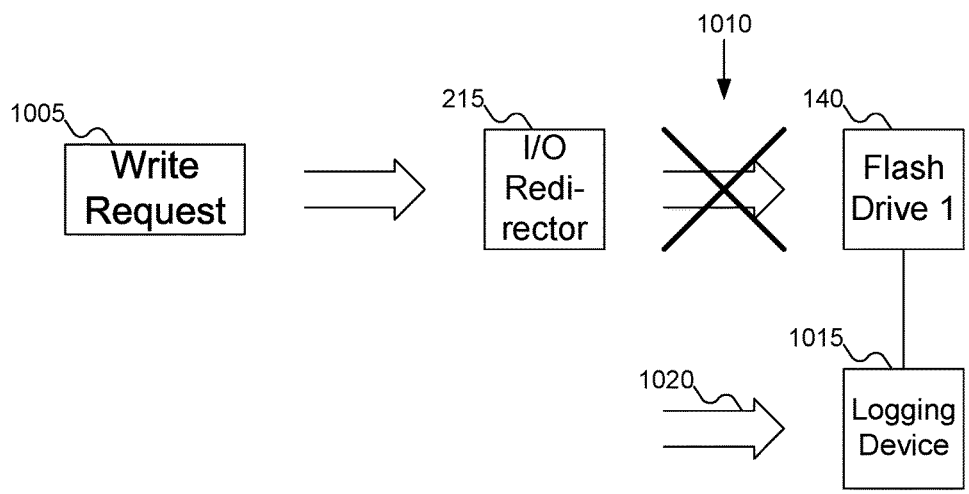
FIG. 10 shows the I/O redirector of FIG. 2 storing write requests in a logging device for the SSD selected in FIG. 6.

Like read request 905 in FIGS. 9A-9B, write requests destined for an SSD performing garbage collection can result in delay. FIG. 10 shows I/O redirector 215 of FIG. 2 storing write requests in a logging device for selected SSD 615 of FIG. 6, to avoid such delays. Instead of delivering write request 1005 to flash drive 145, I/O redirector 215 can intercept write request 1005 (shown by canceled arrow 1010). I/O redirector can then store write request 1005 in logging device 1015 as shown by arrow 1020. Logging device 1015 can be local to storage node 125 of FIG. 1, internal to flash drive 140, or anywhere else desired.

Figure 11:
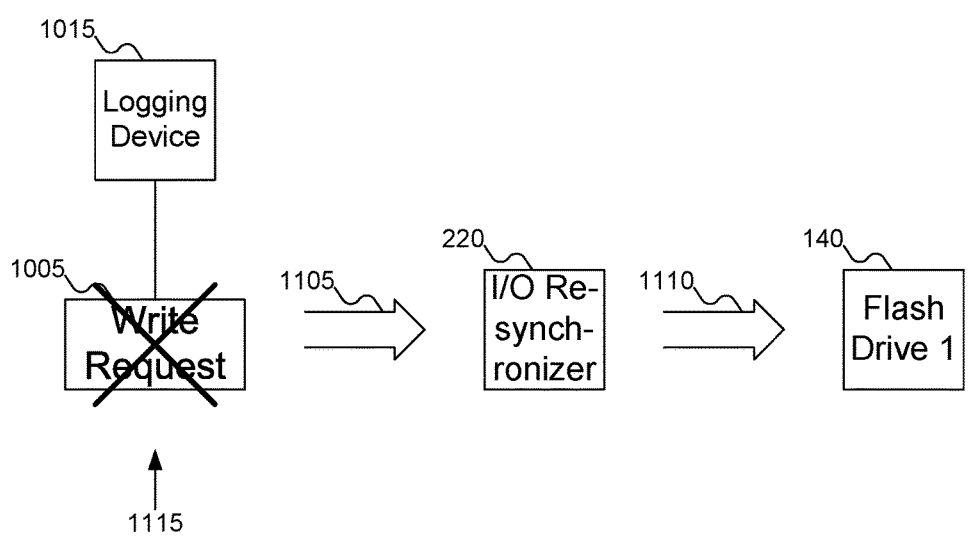
FIG. 11 shows the I/O resynchronizer of FIG. 2 processing write requests stored in the logging device of FIG. 10.

FIG. 11 shows I/O resynchronizer 220 of FIG. 2 processing write requests stored in logging device 1015 of FIG. 10. Once garbage collection has completed on selected SSD 615 of FIG. 6, I/O resynchronizer 220 can access write request 1005 from logging device 1015 as shown by arrow 1105. I/O resynchronizer 220 can then perform write request on flash drive 140, as shown by arrow 1110. Write request 1005 can then be deleted from logging device 1015, as shown by cancellation 1115.

Figure 12:
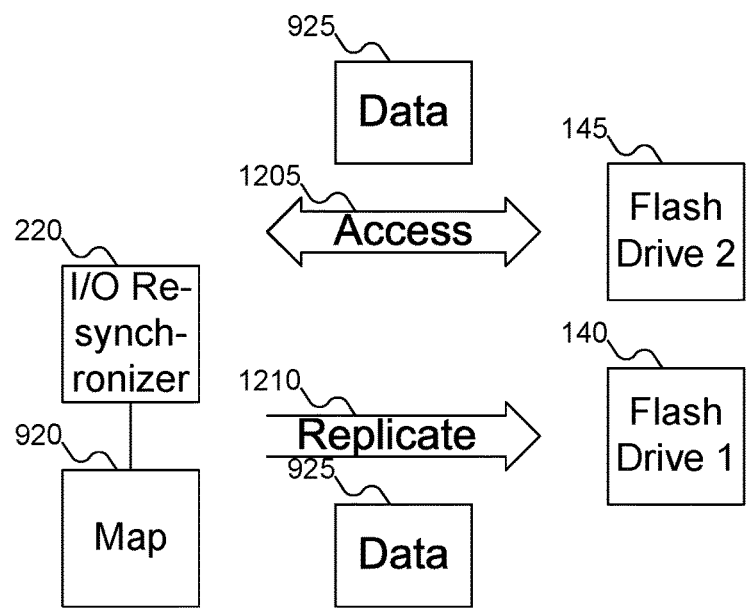
FIG. 12 shows the I/O resynchronizer of FIG. 2 replicating data to the SSD selected in FIG. 6, according to embodiments of the inventive concept.

While logging device 1015 provides a simple way to ensure that flash drive 140 is current with respect to data writes, logging device 1015 is not the only way to resynchronize flash drive 140. Another possibility would be to store information about which pages, blocks, or superblocks on flash drive 140 were due to be changed by write requests that arrived while flash drive 140 was performing garbage collection. I/O resynchronizer 220 can then access the updated data from replicated copies of those pages/blocks/superblocks on other SSDs or other storage devices and write the updated data to flash drive 140. FIG. 12 shows this form of resynchronization.

FIG. 12 shows I/O resynchronizer 220 of FIG. 2 replicating data to selected SSD 615 of FIG. 6, according to embodiments of the inventive concept. In FIG. 12, I/O resynchronizer 220 can request the updated data from flash drive 145 and receive data 925 from flash drive 145 in access exchange 1205. As described above with reference to FIGS. 9A-9B, I/O resynchronizer 220 can identify which SSDs store the updated data, perhaps using map 920, and request the data accordingly: flash drive 145 would not necessarily store all the updated data. I/O resynchronizer 220 can then provide data 925 to flash drive 140 in replicate message 1210.

Figure 13:
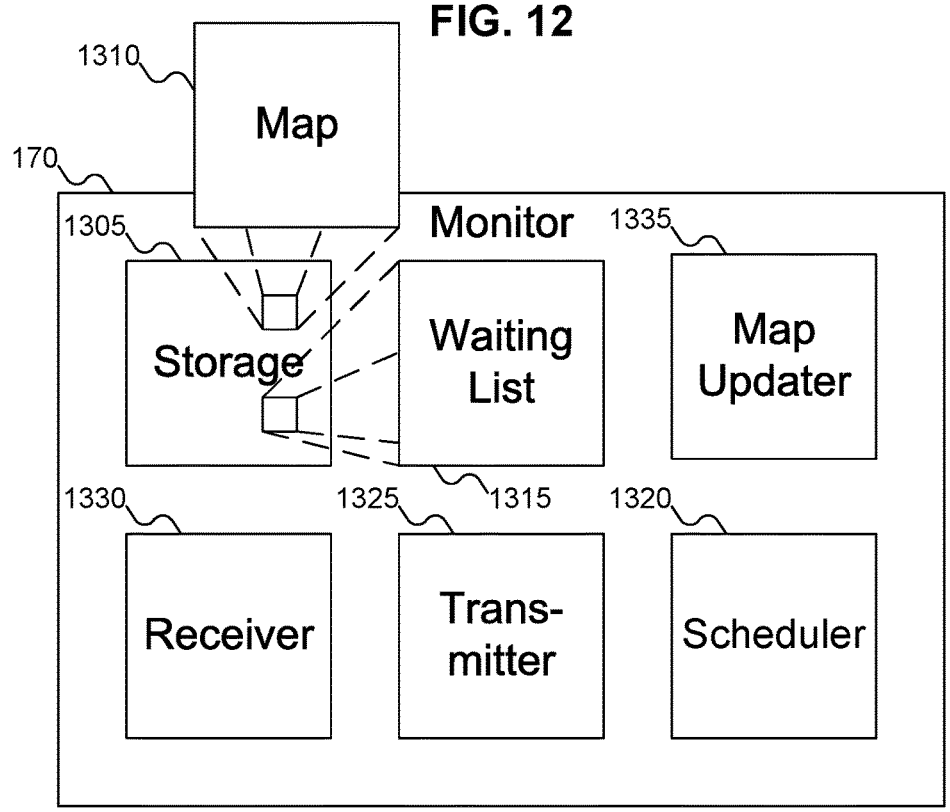
FIG. 13 shows details of the monitor of FIG. 1.

FIG. 13 shows details of monitor 170 of FIG. 1. In FIG. 13, monitor 170 can include storage 1305, which can store map 1310 and waiting list 1315. Monitor 170 can also include receiver 1320, transmitter 1325, and scheduler 1330. Map 1310 can store information about where data is stored on various storage devices across the distributed storage system, along with which devices are available and unavailable: map 1310 is discussed further with reference to FIG. 14 below. Waiting list 1315 can store information about SSDs wanting to perform garbage collection, but which are currently delayed while other SSDs are performing garbage collection, as described above with reference to FIG. 8. Map updater 1335 can update map 1310 as data storage across the distributed storage system changes. Receiver 1320 and transmitter 1325 can be used to receive information from and send information to other devices, such as garbage collection coordinator 210 of FIG. 2. Scheduler 1320 can schedule a garbage collection request for selected SSD 615 of FIG. 6, selecting the time and duration for garbage collection on that SSD.

FIG. 14 shows an example of map 1310 of data of FIG. 13 stored in monitor 170 of FIG. 1. In FIG. 14, map 1310 can include indicators of various units of data 1403, 1406, 1409, and 1412. For example, unit of data 1403 identifies block 0 of file A, unit of data 1406 identifies block 1 of file A, unit of data 1409 identified block 2 of file A, and unit of data 1412 identifies block 0 of file B. Each unit of data can include a count, such as counts 1415, 1418, 1421, and 1424, which indicates how many copies there are of each unit of data. For example, counts 1415, 1418, and 1421 indicate that there are three copies of each of units of data 1403, 1406, and 1409, while count 1424 indicates that there are only two copies of unit of data 1412.

Map 1310 can also include where copies of the various units of data can be found. These are shown as locations 1427, 1430, 1433, 1436, 1439, 1442, 1445, 1448, 1451, 1454, and 1457. Location 1460 is available in case unit of data 1412 eventually has a third copy, but is currently blank as there are only two copies of unit of data 1412 in the distributed storage system.

While FIG. 14 shows map 1310 including four units of data and up to three copies for each unit of data, embodiments of the inventive concept can support any number of units of data and any number of copies for each unit of data. Thus, map 1310 can include theoretically millions (or more) units of data, and might have six copies of each unit of data across the distributed storage system.

Figure 15A:
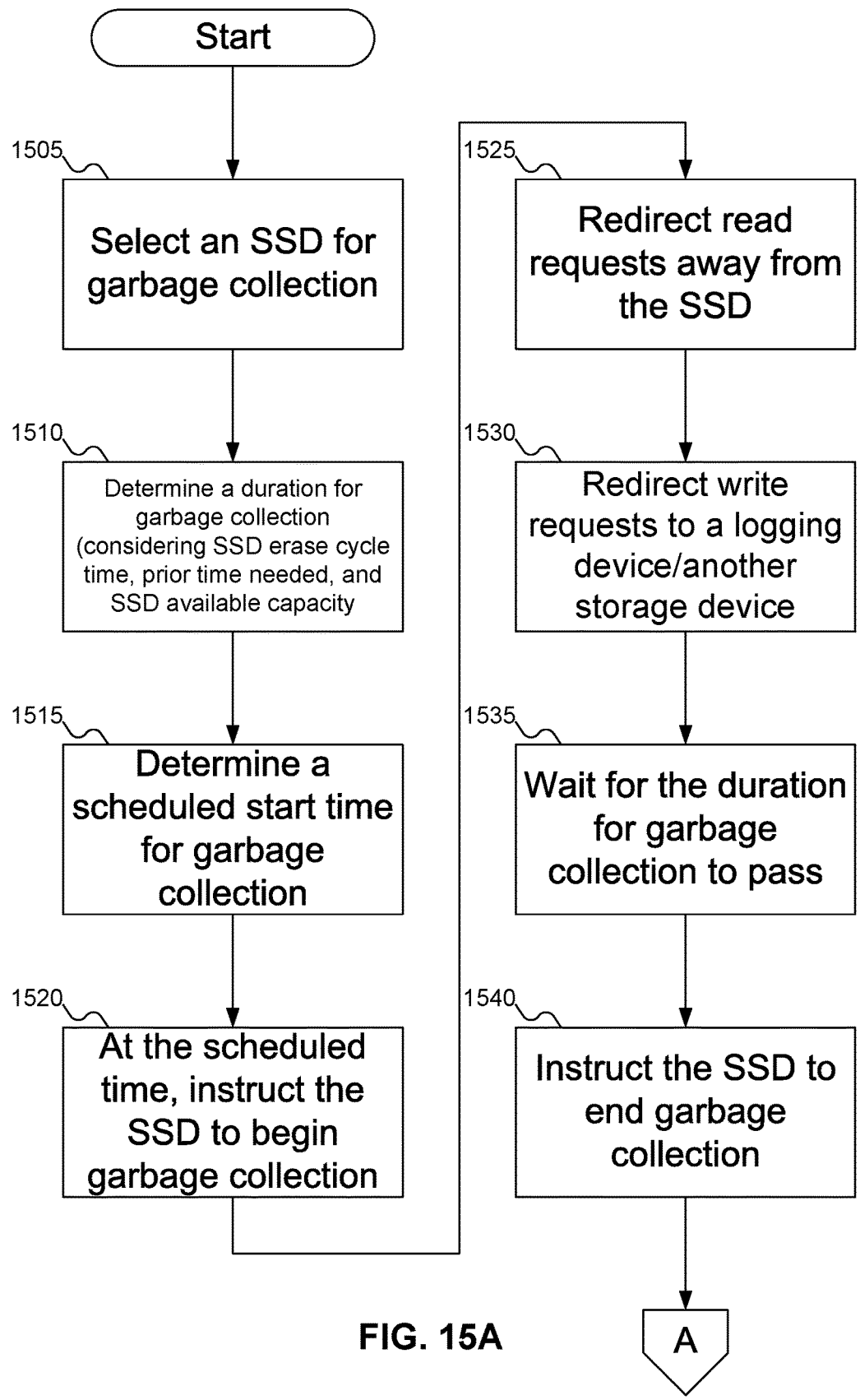
FIGS. 15A-15B show a flowchart of a procedure used by the storage node of FIG. 1 to perform garbage collection on an SSD of FIGS. 1-2, according to an embodiment of the inventive concept.
Figure 15B:
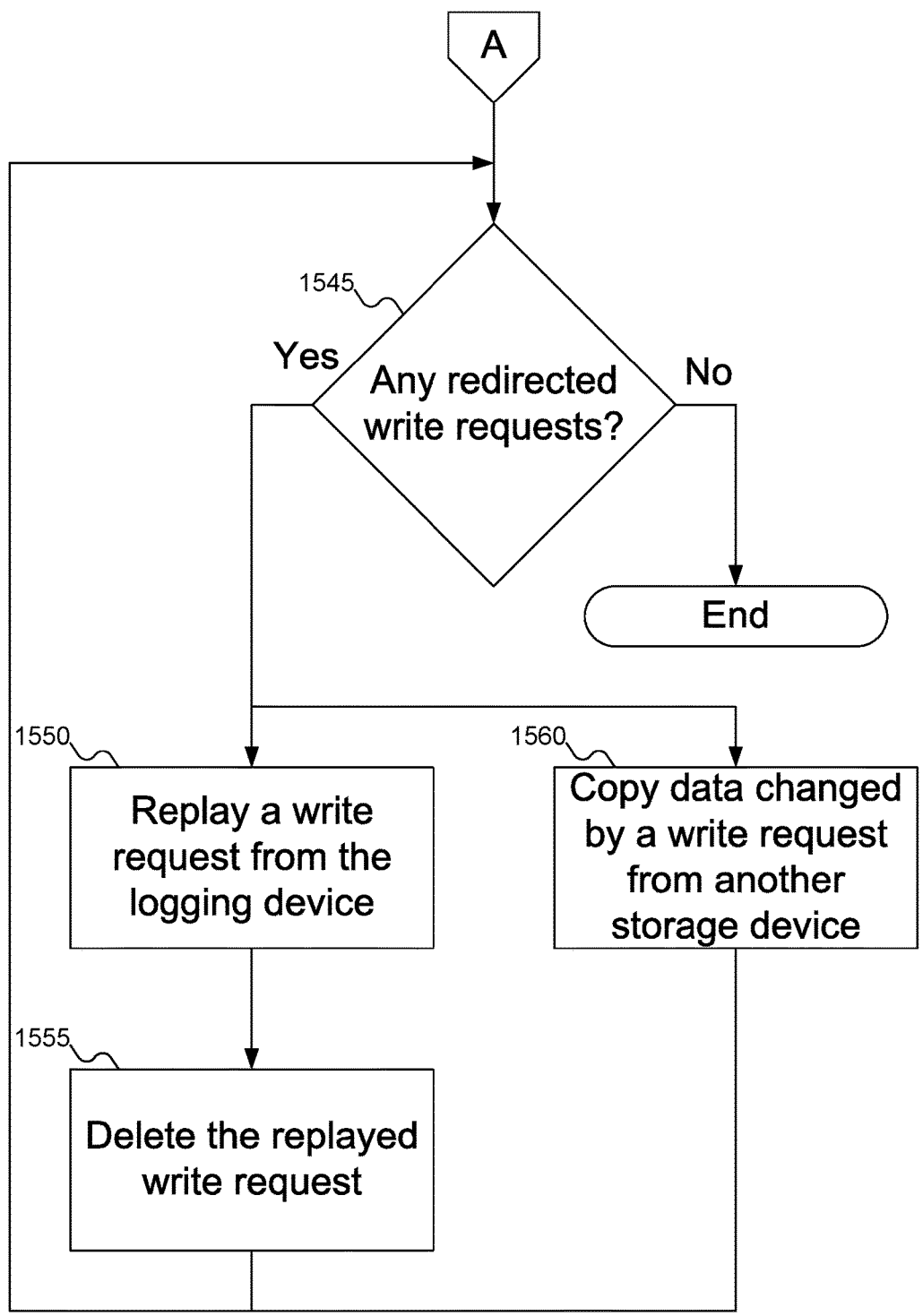

FIGS. 15A-15B show a flowchart of an example procedure used by storage node 125 of FIG. 1 to perform garbage collection on an SSD of FIGS. 1-2, according to an embodiment of the inventive concept. In FIG. 15A, at block 1505, device garbage collection monitor 205 of FIG. 2 can select an SSD, such as flash drive 140 of FIG. 1, to perform garbage collection. At block 1510, device garbage collection monitor 205 of FIG. 2 can determine an estimated time required for flash drive 140 of FIG. 1 to perform garbage collection. Among the factors device garbage collection monitor 205 of FIG. 2 can consider are the erase cycle time required by flash drive 140, the time required for a prior garbage collection event by flash drive 140 of FIG. 1, and the available capacity of flash drive 140 of FIG. 1. At block 1515, garbage collection coordinator 210 of FIG. 2 can determine a scheduled start time for flash drive 140 of FIG. 1 to perform garbage collection. At block 1520, at the scheduled start time, garbage collection coordinator 210 of FIG. 2 can instruct flash drive 140 of FIG. 1 to begin garbage collection.

At block 1525, while flash drive 140 of FIG. 1 is performing garbage collection, I/O redirector 215 of FIG. 2 can redirect read requests 905 away from flash drive 140 of FIG. 1. At block 1530, while flash drive 140 of FIG. 1 is performing garbage collection, I/O redirector can also redirect write requests 1005 of FIG. 10 away from flash drive 140 of FIG. 1 (either to a logging device to store write requests 1005 of FIG. 10, or to another storage device to perform write request 1005 of FIG. 10). At block 1535, storage node 125 of FIG. 1 can wait until flash drive 140 of FIG. 1 completes garbage collection. At block 1540, garbage collection coordinator 210 of FIG. 2 can instruct flash drive 140 of FIG. 1 to end garbage collection. As described above with reference to FIG. 8, block 1540 can be omitted if flash drive 140 cannot be interrupted during garbage collection.

At block 1545 (FIG. 15B), I/O resynchronizer 220 of FIG. 2 can determine if there are any write requests 1005 were redirected (in block 1530). If so, then at block 1550 I/O resynchronizer 220 of FIG. 2 can access and replay write request 1005 of FIG. 10 from logging device 1015 of FIG. 10, and at block 1555 I/O resynchronizer 220 of FIG. 2 can delete write request 1005 of FIG. 10 from logging device 1015 of FIG. 10. As described above with reference to FIG.

12, replaying write request 1005 of FIG. 10 in block 1550 can involve accessing updated data from flash drive 145 of FIG. 1, rather than actually replaying the original write request 1005. Therefore, alternatively, at block 1560 I/O resynchronizer 220 of FIG. 2 can copy data changed by write request 1005 of FIG. 10 from another storage device that processed write request 1005 of FIG. 10. Control can then return to block 1545 to check for further write requests 1005 of FIG. 10 in logging device 1015 of FIG. 10.

Figure 16A:
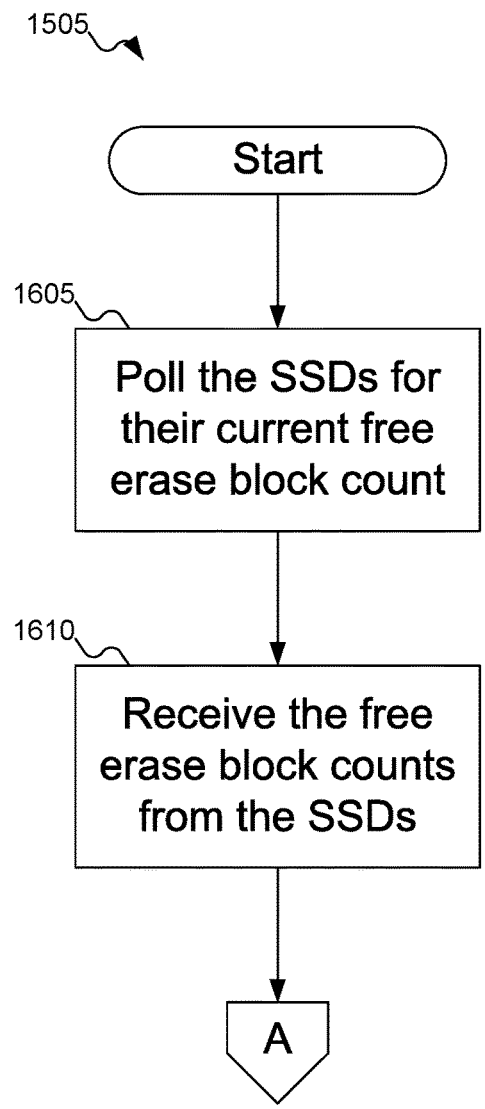
FIGS. 16A-16B show a flowchart of a procedure used by the device garbage collection monitor of FIG. 2 to select an SSD for garbage collection, according to an embodiment of the inventive concept.
Figure 16B:
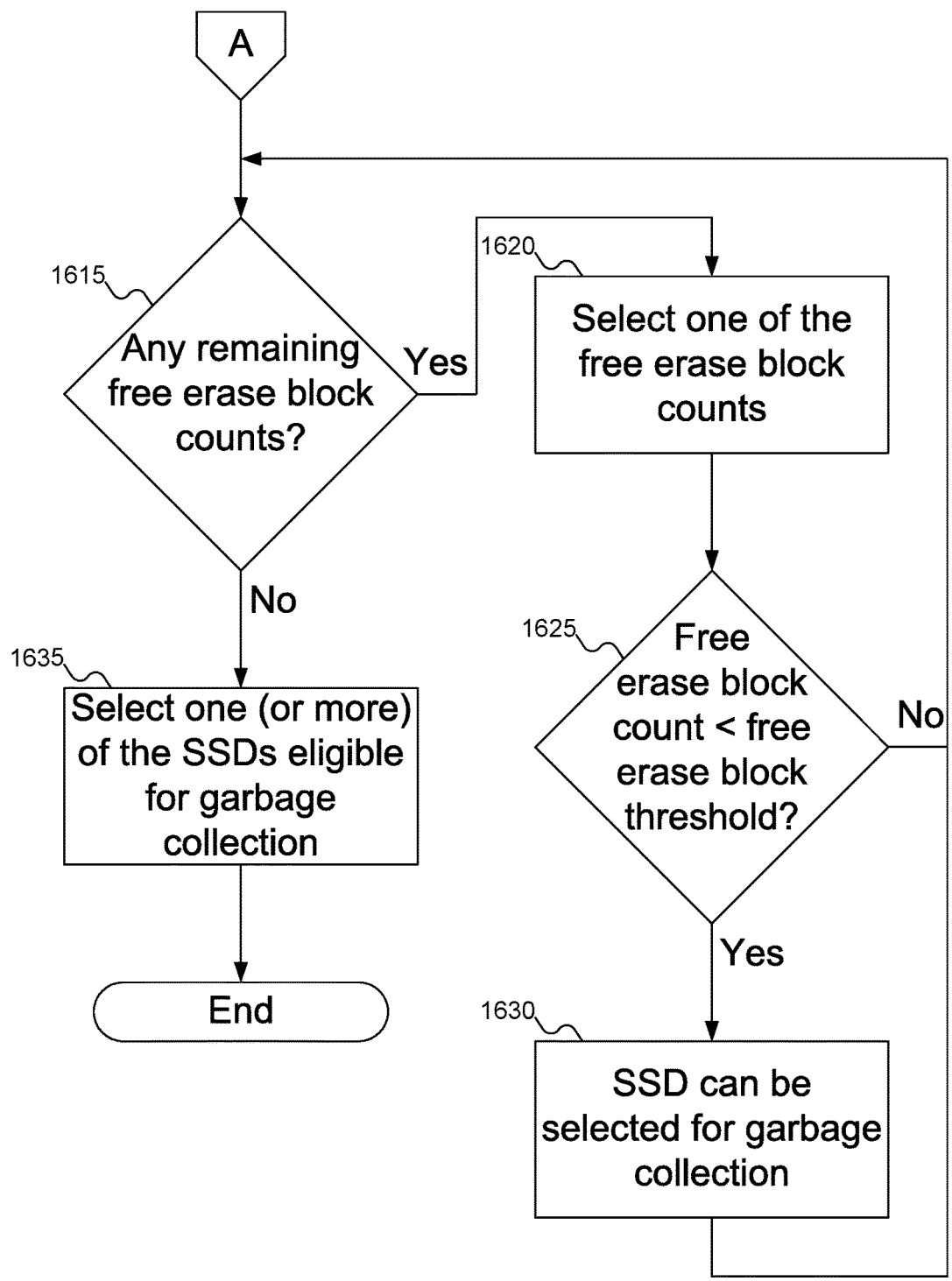

FIGS. 16A-16B show a flowchart of an example procedure used by the device garbage collection monitor of FIG. 2 to select an SSD for garbage collection, according to an embodiment of the inventive concept. In FIG. 16A, at block 1605, device garbage collection monitor 205 of FIG. 2 can poll flash drives 140, 145, 225, and 230 of FIGS. 1-2 for their free erase block counts. At block 1610, device garbage collection monitor 205 of FIG. 1 can receive free erase block counts 505, 510, 515, and 520 of FIG. 5 from flash drives 140, 145, 225, and 230 of FIGS. 1-2.

At block 1615 (FIG. 16B), device garbage collection monitor 205 of FIG. 2 can determine if there are any remaining free erase block counts to process. If so, then at block 1620 device garbage collection monitor 205 of FIG. 2 can select one of the free erase block counts. At block 1625, device garbage collection monitor 205 of FIG. 2 can determine whether the selected free erase block count is below free erase block threshold 610 of FIG. 6. If so, then at block 1630 device garbage collection monitor 205 of FIG. 2 can note that the corresponding SSD can be eligible for garbage collection. Control then returns to block 1615 to check for further free erase block counts to process.

If there are no remaining free erase block counts to process at block 1615, then at block 1635 device garbage collection monitor 205 of FIG. 2 can select one of the eligible SSDs for garbage collection. If there is only one SSD eligible for garbage collection, then that SSD can be selected. If there is more than one eligible SSD, then device garbage collection monitor 205 of FIG. 2 can select one of the eligible SSDs using any desired algorithm. Possible algorithms that can be used include selecting an eligible SSD at random, or selecting the eligible SSD with the lowest free erase block count or the lowest percentage of free erase blocks. Device garbage collection monitor 205 of FIG. 2 can also select more than one eligible SSD for garbage collection. Selecting more than one eligible SSD for garbage collection is particularly useful where monitor 170 of FIG. 1 uses GC with Acknowledgment, since monitor 170 of FIG. 1 could schedule all SSDs eligible for garbage collection in a manner than avoids multiple SSDs performing garbage collection at the same time.

Figure 17:
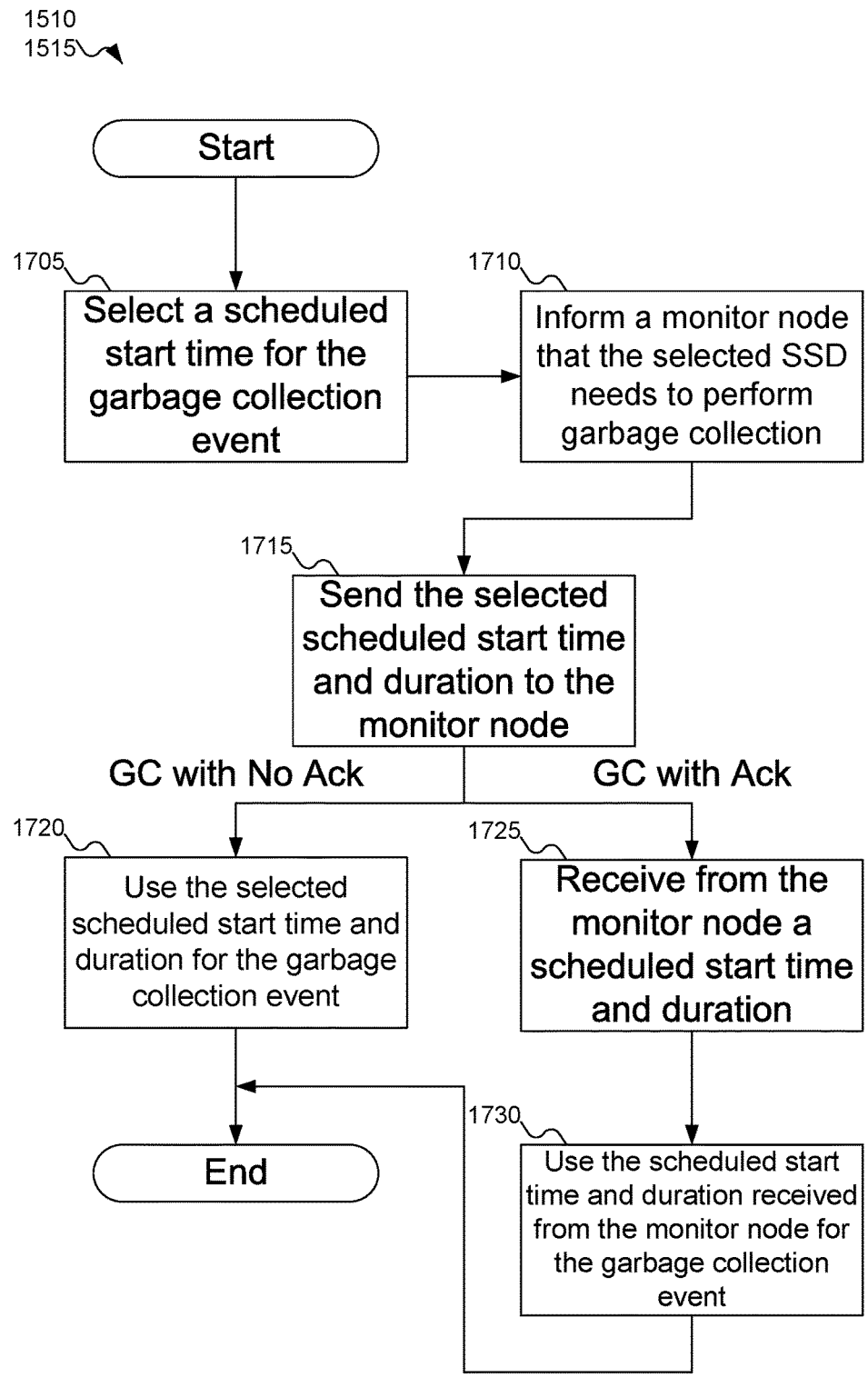
FIG. 17 shows a flowchart of a procedure for the garbage collection coordinator of FIG. 2 to schedule garbage collection for the SSD selected in FIG. 6.

FIG. 17 shows a flowchart of an example procedure for garbage collection coordinator 210 of FIG. 2 to schedule garbage collection for selected SSD 615 of FIG. 6. In FIG. 17, at block 1705, garbage collection coordinator 210 of FIG. 2 can select scheduled start time 810 for selected SSD 615 of FIG. 6. As described above with reference to FIG. 8, scheduled start time 810 selected by garbage collection coordinator 210 of FIG. 2 is not necessarily binding, and a different scheduled start time 810 of FIG. 8 can be assigned by monitor 170 of FIG. 1. At block 1710, garbage collection coordinator 210 of FIG. 2 can notify monitor 170 of FIG. 1 that selected SSD 615 of FIG. 6 needs to perform garbage collection. At block 1715, garbage collection coordinator 210 of FIG. 2 can notify monitor 170 of FIG. 1 of selected start time 810 of FIG. 8 and estimated time 725 of FIG. 7 required by selected SSD 615 of FIG. 6 to perform garbage collection.

At this point, the flowchart can diverge, depending on whether embodiments of the inventive concept use GC with Acknowledgement or GC with No Acknowledgment. In embodiments of the inventive concept using GC with No Acknowledgement, at block 1720 garbage collection coordinator 210 of FIG. 2 uses scheduled start time 810 of FIG. 8 and estimated time 725 of FIG. 7 required by selected SSD 615 of FIG. 6 to perform garbage collection, and can instruct selected SSD 615 of FIG. 6 to perform garbage collection at scheduled start time 810 of FIG. 8.

In embodiments of the inventive concept using GC with Acknowledgement, at block 1725 garbage collection coordinator 210 of FIG. 2 can receive scheduled start time 810 and duration 820 of FIG. 8 from monitor 170 of FIG. 1. Then, at block 1730, garbage collection coordinator can use scheduled start time 810 and duration 820 of FIG. 8 received from monitor 170 of FIG. 1 to schedule when selected SSD 615 of FIG. 6 performs garbage collection.

Figure 18:
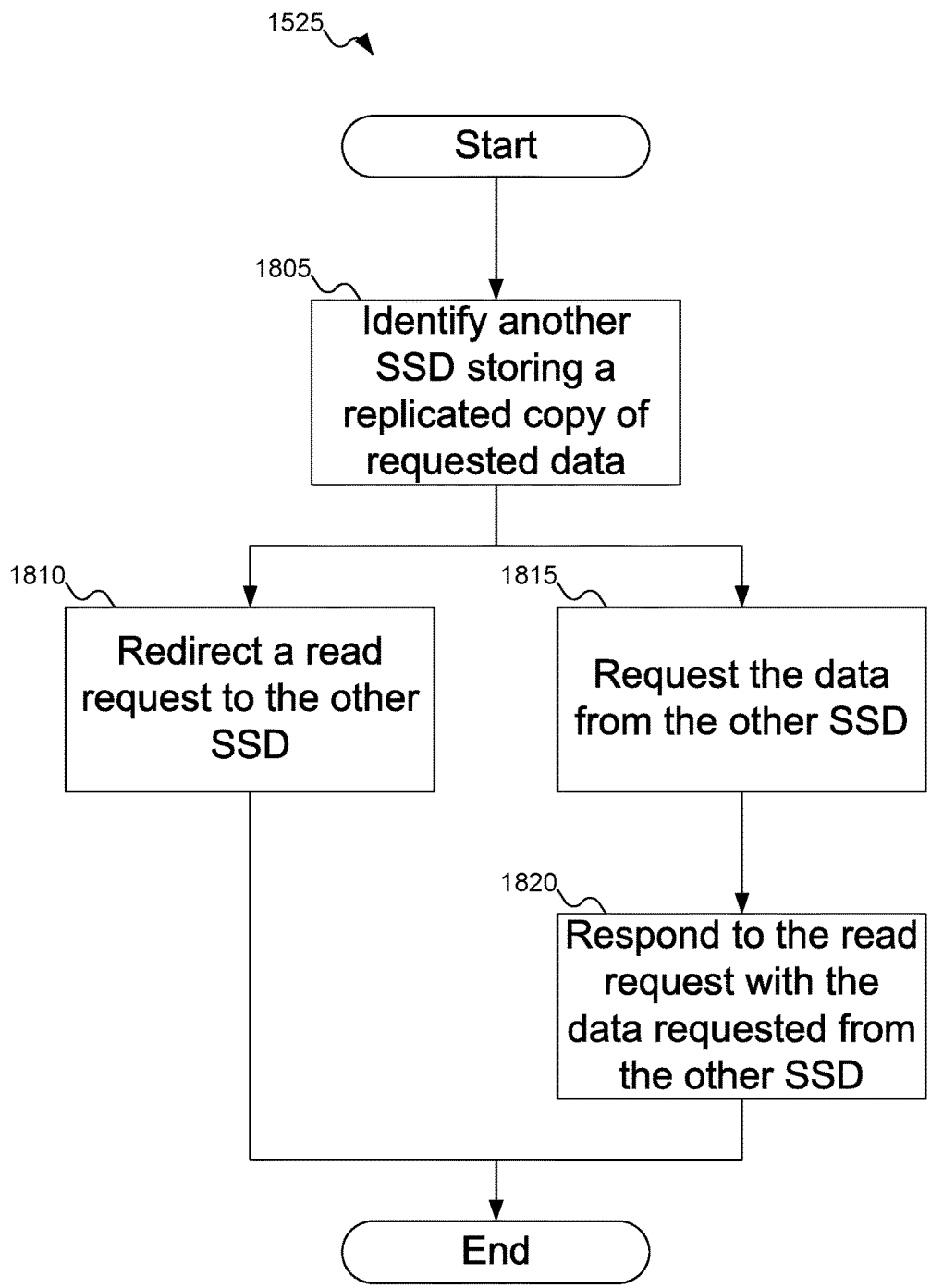
FIG. 18 shows a flowchart of a procedure for the I/O redirector of FIG. 2 to redirect read requests, according to an embodiment of the inventive concept.

FIG. 18 shows a flowchart of an example procedure for I/O redirector 215 of FIG. 2 to redirect read requests 905 of FIG. 9, according to an embodiment of the inventive concept. In FIG. 18, at block 1805, I/O redirector 215 of FIG. 2 can identify flash drive 145 of FIG. 1 as storing a replicated copy of the requested data. As described above with reference to FIGS. 9A-9B, I/O redirector 215 of FIG. 2 can use map 920 of FIGS. 9A-9B to determine that flash drive 145 of FIG. 1 stores a replicated copy of the requested data, and map 920 of FIGS. 9A-9B can be stored either locally to storage node 125 of FIG. 1, on monitor 170 of FIG. 1, or elsewhere, as desired.

Once I/O redirector 215 of FIG. 2 has determined that flash drive 145 of FIG. 1 stores a replicated copy of the requested data, different embodiments of the inventive concept can proceed in different ways. In some embodiments of the inventive concept, at block 1810 I/O redirector 215 of FIG. 2 can simply redirect read request 905 of FIGS. 9A-9B to flash drive 145 of FIG. 1, and let flash drive 145 of FIG. 1 provide the data 925 of FIGS. 9A-9B directly to the requesting client. In other embodiments of the inventive concept, at block 1815, I/O redirector 215 of FIG. 2 can request the data from flash drive 145 of FIG. 1, and at block 1820 I/O redirector 215 of FIG. 2 can provide the data 925 of FIGS. 9A-9B to the requesting client.

Figure 19:
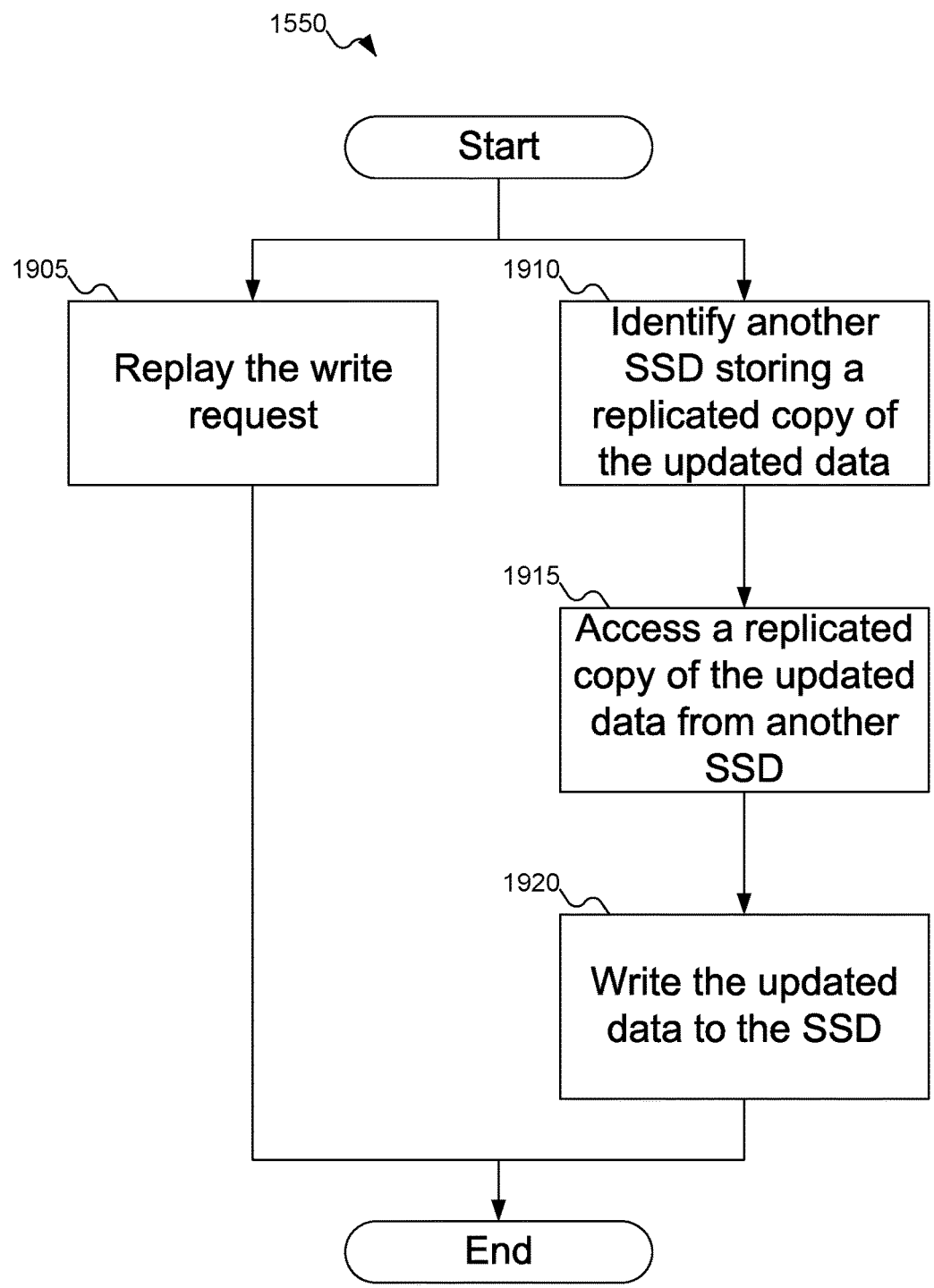
FIG. 19 shows a flowchart of a procedure for the I/O resynchronizer of FIG. 2 to process logged write requests, according to an embodiment of the inventive concept.

FIG. 19 shows a flowchart of an example procedure for I/O resynchronizer 220 of FIG. 2 to process logged write requests 1005 of FIG. 10, according to an embodiment of the inventive concept. How I/O resynchronizer 220 of FIG. 2 processes logged write requests 1005 of FIG. 10 depends on how logging device 1015 of FIG. 10 was used. If logging device 1015 of FIG. 10 stores write requests 1005 of FIG. 10 as originally generated by the requesting client, then at block 1905 I/O resynchronizer 220 of FIG. 2 can simply replay write requests 1005 of FIG. 10 as though they had just been received.

But logging device 1015 of FIG. 10 might store just an indicator of what pages, blocks, or superblocks are affected by write requests 1005 of FIG. 10. In that case, at block 1910 I/O resynchronizer 220 of FIG. 2 can identify flash drive 145 of FIG. 1 as storing a replicated copy of the updated data. As described above with reference to FIG. 12, I/O resynchronizer 220 of FIG. 2 can use map 920 of FIG. 12 to determine that flash drive 145 of FIG. 1 stores a replicated copy of the update data, and map 920 of FIG. 12 can be stored either locally to storage node 125 of FIG. 1, on monitor 170 of FIG. 1, or elsewhere, as desired.

Once I/O redirector 220 of FIG. 2 has identified that flash drive 145 stores a replicated copy of the updated data, at block 1915 I/O redirector 220 of FIG. 2 can access the updated data from flash drive 145 of FIG. 1. Then, at block 1920, I/O redirector 220 of FIG. 2 can instruct selected SSD 615 of FIG. 6 to write the updated data.

Figure 20:
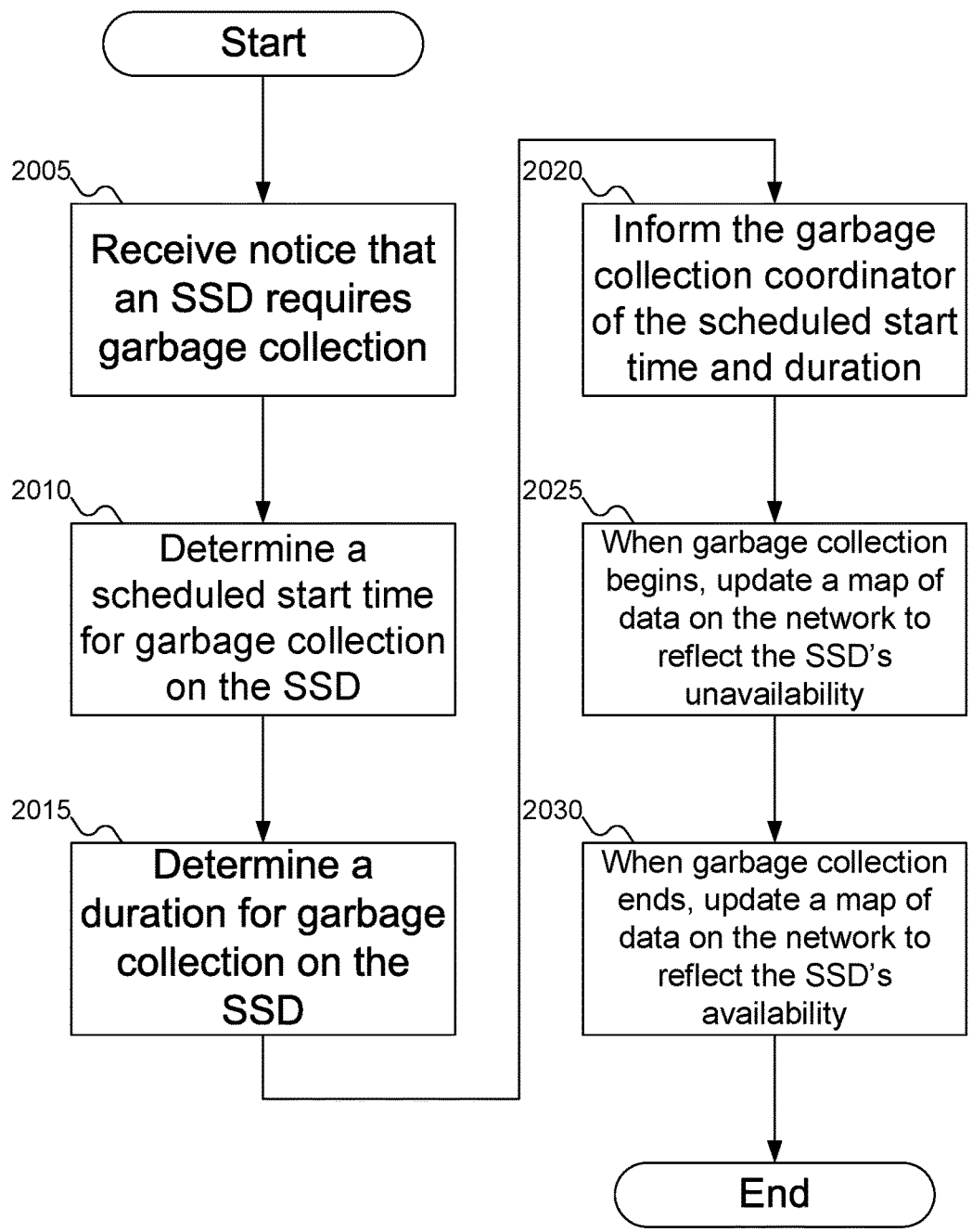
FIGS. 20 and 21 show flowcharts of procedures for the monitor of FIG. 1 to handle when the SSD selected in FIG. 6 is performing garbage collection, according to embodiments of the inventive concept.
Figure 21:
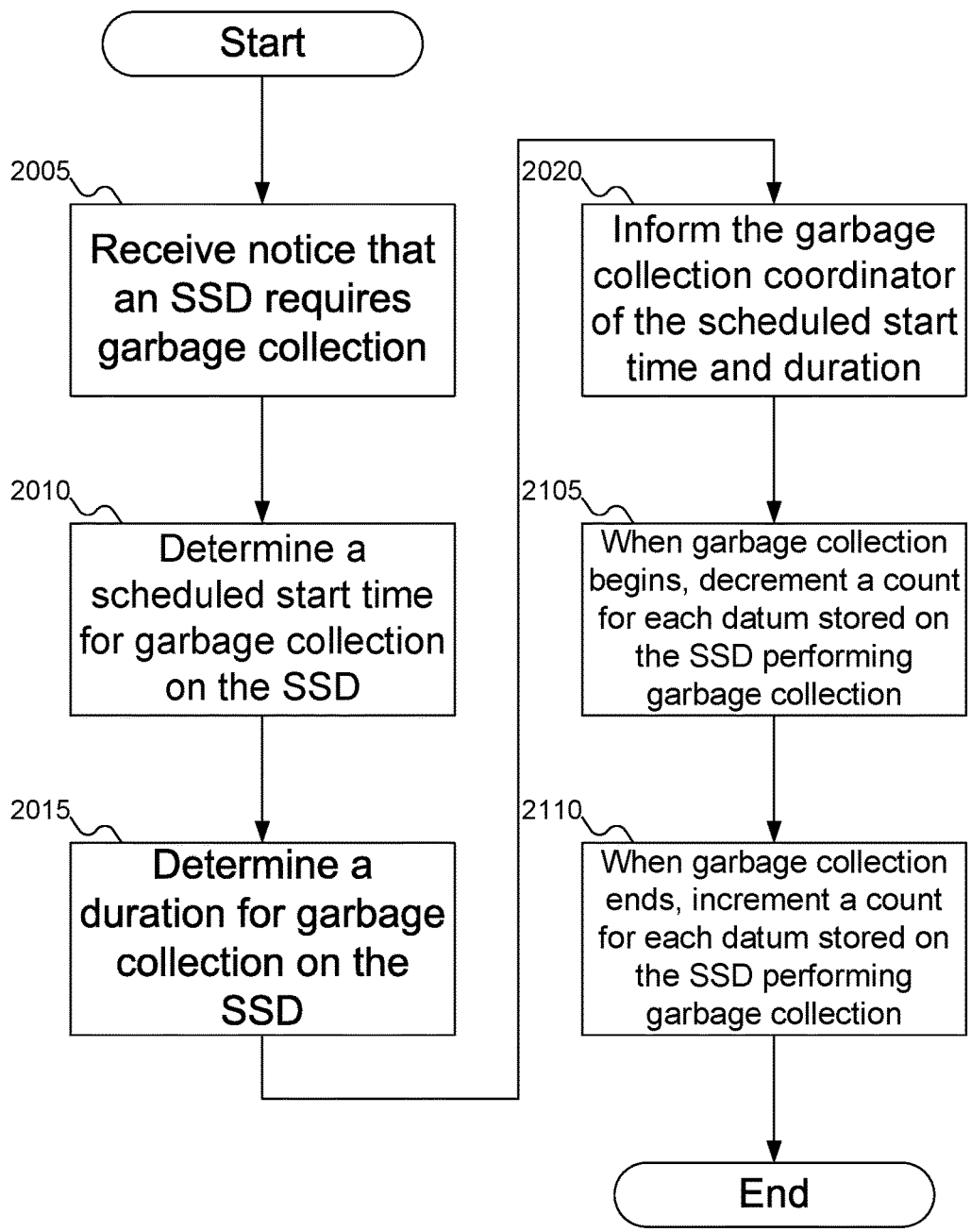

FIGS. 20 and 21 show flowcharts of example procedures for monitor 170 of FIG. 1 to handle when selected SSD 615 of FIG. 6 is performing garbage collection, according to embodiments of the inventive concept. In FIG. 20, at block 2005, monitor 170 of FIG. 1 can receive notice from garbage collection coordinator 210 of FIG. 1 that selected SSD 615 of FIG. 6 needs to perform garbage collection. This notice can include scheduled start time 810 of FIG. 8 and estimated time 725 of FIG. 7 required by selected SSD 615 of FIG. 6 to perform garbage collection. At block 2010, monitor 170 of FIG. 1 can select a scheduled start time for selected SSD 615 of FIG. 6 to perform garbage collection, and at block 2015, monitor 170 of FIG. 1 can select a duration for selected SSD 615 of FIG. 6 to perform garbage collection. At block 2020, monitor 170 can notify garbage collection coordinator 210 of FIG. 2 of scheduled start time 810 and duration 820 of FIG. 8.

At block 2025, when scheduled start time 810 of FIG. 8 for garbage collection arrives, monitor 170 of FIG. 1 can update map 1310 of FIG. 13 of data in the distributed storage system to reflect that selected SSD 615 of FIG. 6 is now unavailable. Monitor 170 of FIG. 1 can be informed that garbage collection has started on selected SSD 615 of FIG. 6 via a notification from garbage collection coordinator 210 of FIG. 2. At block 2030, when garbage collection completes, monitor 170 of FIG. 1 can update map 1310 of FIG. 13 of data in the distributed storage system to reflect that selected SSD 615 of FIG. 6 is now once again available. Monitor 170 of FIG. 1 can be informed that garbage collection has ended on selected SSD 615 of FIG. 6 via a notification from garbage collection coordinator 210 of FIG. 2.

FIG. 20 represents embodiments of the inventive concept using GC with Acknowledgement. In embodiments of the inventive concept using GC with No Acknowledgement, blocks 2010, 2015, and 2020 would be omitted, as monitor 170 of FIG. 1 would not select scheduled start time 810 or duration 820 of FIG. 8 for garbage collection on selected SSD 615 of FIG. 6.

FIG. 21 is similar to FIG. 20. The difference between FIGS. 20 and 21 is that in FIG. 21, blocks 2025 and 2030 are replaced with blocks 2105 and 2110. At block 2105, when scheduled start time 810 of FIG. 8 for garbage collection arrives, monitor 170 of FIG. 1 can decrement counts 1415, 1418, 1421, and 1424 of FIG. 14 for each unit 1403, 1406, 1409, and 1412 of FIG. 14 of data in map 1310 of FIG. 13 of data in the distributed storage system to reflect that data stored on selected SSD 615 of FIG. 6 is now unavailable. Monitor 170 of FIG. 1 can be informed that garbage collection has started on selected SSD 615 of FIG. 6 via a notification from garbage collection coordinator 210 of FIG. 2. At block 2110, when garbage collection completes, monitor 170 of FIG. 1 can increment counts 1415, 1418, 1421, and 1424 of FIG. 14 for each unit 1403, 1406, 1409, and 1412 of FIG. 14 of data in map 1310 of FIG. 13 of data in the distributed storage system to reflect that data stored on selected SSD 615 of FIG. 6 is now once again available. Monitor 170 of FIG. 1 can be informed that garbage collection has ended on selected SSD 615 of FIG. 6 via a notification from garbage collection coordinator 210 of FIG. 2.

Figure 22A:
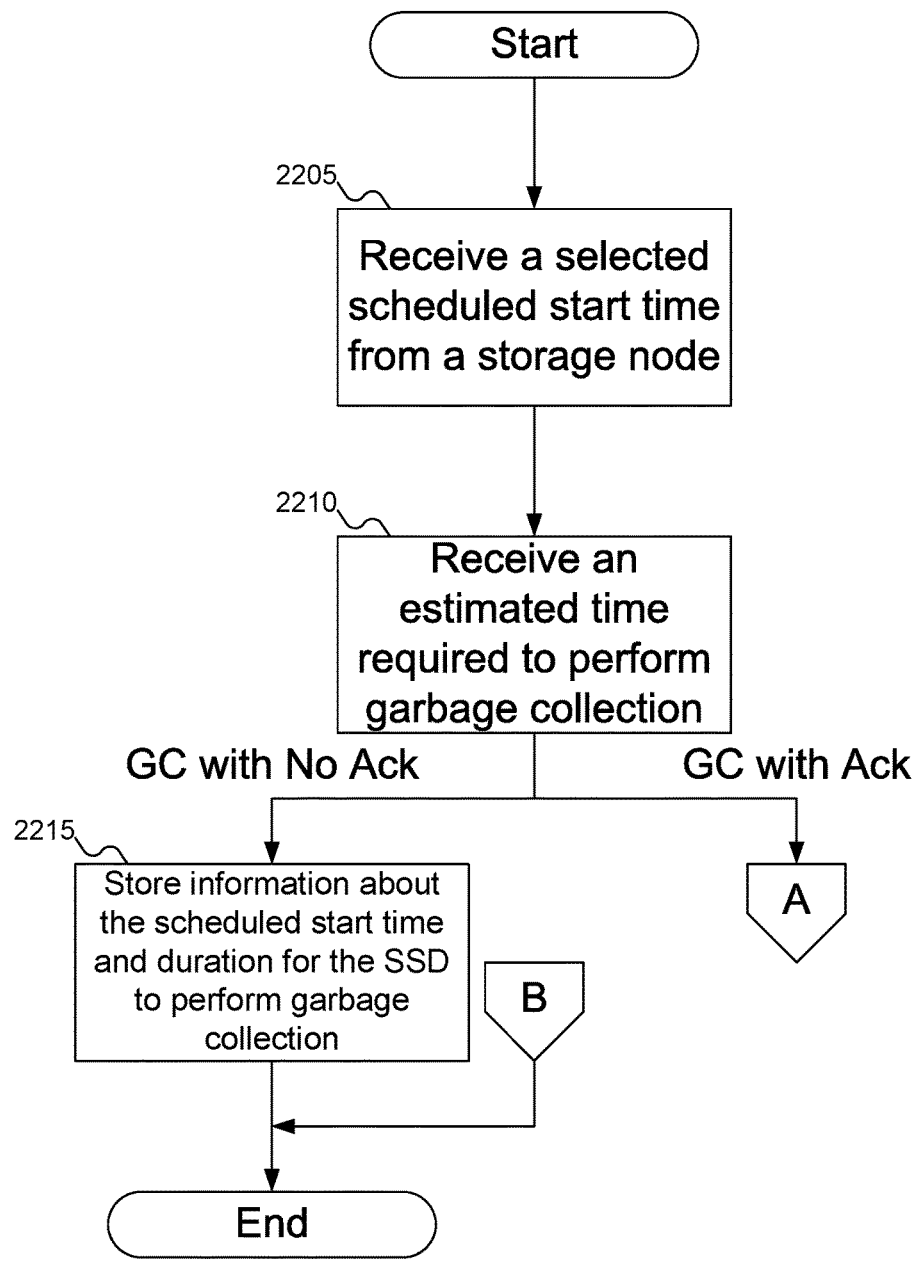
FIGS. 22A-22B show a flowchart of a procedure for the monitor of FIG. 1 to determine the start time and duration of garbage collection for the SSD selected in FIG. 6, according to an embodiment of the inventive concept.
Figure 22B:
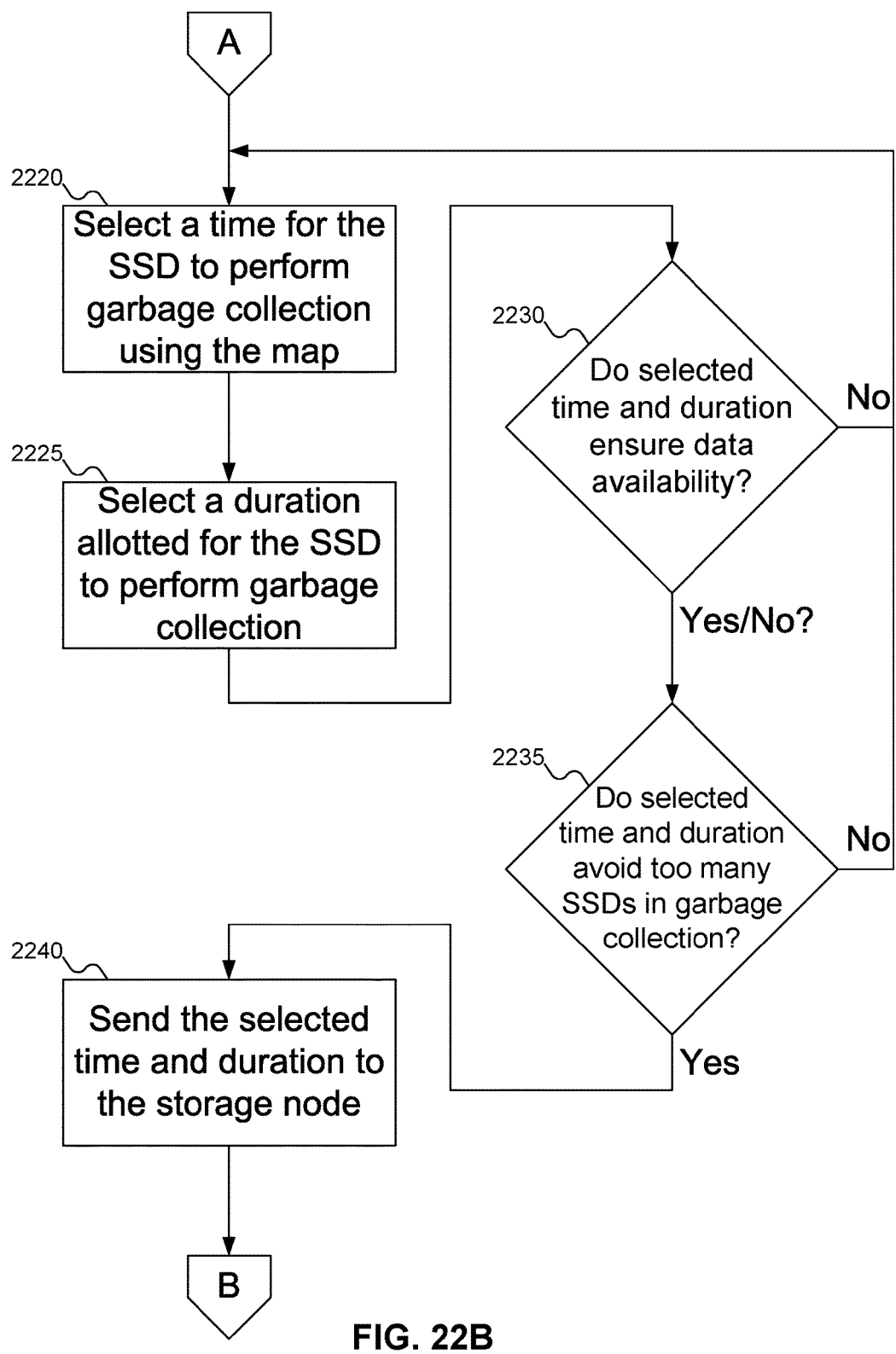

FIGS. 22A-22B show a flowchart of an example procedure for monitor 170 of FIG. 1 to determine scheduled start time 810 and duration 820 of FIG. 8 of garbage collection for selected SSD 615 of FIG. 6, according to an embodiment of the inventive concept. In FIG. 22A, at block 2205, monitor 170 of FIG. 1 can receive scheduled start time 810 of FIG. 8 as selected by garbage collection coordinator 210 of FIG. 2. At block 2210, monitor 170 of FIG. 1 can receive estimated time 725 of FIG. 7 required for selected SSD 615 of FIG. 6 to perform garbage collection.

At this point, the flowchart can diverge, depending on whether embodiments of the inventive concept use GC with Acknowledgement or GC with No Acknowledgment. In embodiments of the inventive concept using GC with No Acknowledgement, at block 2215, monitor 170 can store scheduled start time 810 of FIG. 8 and estimated time 725 of FIG. 7 required for selected SSD 615 of FIG. 6 to perform garbage collection. Since monitor 170 does not send an acknowledgement when the distributed storage system uses GC with No Acknowledgement, at this point monitor 170 of FIG. 1 has completed its determination of scheduled start time 810 and duration 820 of FIG. 8.

In embodiments of the inventive concept using GC with Acknowledgement, at block 2220 (FIG. 22B) monitor 170 can select a start time for selected SSD 615 of FIG. 6 to perform garbage collection. At block 2225, monitor 170 of FIG. 1 can select a time allotted for selected SSD 615 to perform garbage collection. At block 2230, monitor 170 of FIG. 1 can check to see if the selected start time and time allotted for selected SSD 615 of FIG. 6 ensure that data stored on selected SSD 615 of FIG. 6 will be available (via replicated copies on other storage devices). At block 2235, monitor 170 of FIG. 1 can check to see if the selected start time and time allotted for selected SSD 615 of FIG. 6 would overlap with other SSDs performing garbage collection, making too many devices unavailable at the same time. If the checks in either of blocks 2230 and 2235 return negative results (either data would be completely unavailable, or too many SSDs would be performing garbage collection at the same time), then control can return to block 2220 for monitor 170 of FIG. 1 to select a new start time and time allotted. Otherwise, at block 2240 monitor 170 can send to garbage collection coordinator 210 of FIG. 2 the selected start time and time allotted as scheduled start time 810 and duration 820 of FIG. 8.

Note that the two checks in blocks 2230 and 2235 are different. For example, it can happen that block 2230 indicates that replicated copies of the data on selected SSD 615 are available on other storage devices, but because too many other SSDs are performing garbage collection at the same time, block 2235 would fail. On the other hand, if only one other SSD is performing garbage collection at the same time, block 2235 might indicate that selected SSD 615 of FIG. 6 could perform garbage collection: but if the other SSD performing garbage collection had the only other copy of some data on selected SSD 615 of FIG. 6, block 2230 would fail.

Note also that the arrow leading from block 2230 to block 2235 is labeled "Yes/No?". If block 2230 indicates that data would be available despite selected SSD 615 performing garbage collection, then control can proceed to block 2235. But it might happen that selected SSD 615 has the only copy of some data on the distributed storage system. If this happens, then selected SSD 615 of FIG. 6 could not be scheduled for garbage collection at any time without some data becoming unavailable (at least, until that data is replicated). In this situation, selected SSD 615 of FIG. 6 might have to be permitted to perform garbage collection, despite the fact that some data would become unavailable.

Another reason why selected SSD 615 of FIG. 6 might be scheduled for garbage collection even though some data would become unavailable would be if selected SSD 615 of FIG. 6 has waited a sufficient amount of time to perform garbage collection. That is, if selected SSD 615 of FIG. 6 has been waiting to perform garbage collection beyond some threshold amount of time, selected SSD 615 of FIG. 6 can be permitted to perform garbage collection even though that fact might mean that some data on the distributed storage system would be unavailable.

FIGS. 22A-22B do not show monitor 170 of FIG. 1 using waiting list 1315 of FIG. 13. If monitor 170 of FIG. 1 cannot schedule selected SSD 615 of FIG. 6 for garbage collection because too many SSDs are performing garbage collection, monitor 170 of FIG. 1 can store information about selected SSD 615 of FIG. 6 in waiting list 1315 of FIG. 13 until fewer SSDs are performing garbage collection. Monitor 170 can then remove selected SSD 615 of FIG. 6 from waiting list 1315 of FIG. 13, and return control to block 2220 to again attempt to schedule garbage collection for selected SSD 615 of FIG. 6.

If too many SSDs want to perform garbage collection at the same time and monitor 170 of FIG. 1 cannot schedule them all, monitor 170 of FIG. 1 can use any desired algorithm to select which SSDs get to perform garbage collection. Possible approaches include selecting an appropriate number of SSDs at random, selecting SSDs based on the arrival times of the notices from garbage collection coordinator 210 of FIG. 2, selecting SSDs that are considered the most important (to keep those SSDs as open as possible for new data writes), or selecting SSDs that store the least amount of important data (to keep important data available). How many SSDs can be permitted to perform garbage collection at the same time is a system parameter, and can be specified as a percentage of available SSDs or a fixed number, and can be specified statically (when the distributed storage system is deployed) or dynamically (changing as conditions within the distributed storage system change).

Although FIGS. 22A-22B describe an example operation of monitor 170 of FIG. 1 with respect to only one selected SSD 615 of FIG. 6, monitor 170 of FIG. 1 can perform the example procedure of FIGS. 22A-22B for many SSDs at the same time. For example, monitor 170 of FIG. 1 might receive notice at the same time that a number of SSDs all need to perform garbage collection. Monitor 170 of FIG. 1 can perform the example procedure of FIGS. 22A-22B for all the SSDs at the same time.

In FIGS. 15A-22B, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept can be implemented. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept can extend to the following statements, without limitation:

Statement 1. An embodiment of the inventive concept includes a distributed storage system node (125, 130, 135), comprising:

at least one storage device (140, 145, 150, 155, 160, 165, 225, 230);

a device garbage collection monitor (205) to determine a count (505, 510, 515, 520) of free erase blocks on each of the storage devices (140, 145, 150, 155, 160, 165, 225, 230);

a garbage collection coordinator (210) to schedule a garbage collection event on a selected storage device (140, 145, 150, 155, 160, 165, 225, 230) of the at least one storage devices (140, 145, 150, 155, 160, 165, 225, 230).

an Input/Output (I/O) redirector (215) to process a read request (905) using a second storage device (140, 145, 150, 155, 160, 165, 225, 230) storing a replicated copy of the requested data (925) and to redirect a write request (1005); and an I/O resynchronizer (220) to update the storage device (140, 145, 150, 155, 160, 165, 225, 230) to incorporate any write requests (1005).

Statement 2. An embodiment of the inventive concept includes a distributed storage system node (125, 130, 135) according to statement 1, wherein the storage device (140, 145, 150, 155, 160, 165, 225, 230) includes a Solid State Drive (SSD) (140, 145, 150, 155, 160, 165, 225, 230).

Statement 3. An embodiment of the inventive concept includes a distributed storage system node (125, 130, 135) according to statement 1, wherein the I/O redirector (215) is operative to process a read request (905) using a second distributed storage system node (125, 130, 135) containing the second storage device (140, 145, 150, 155, 160, 165, 225, 230) storing the replicated copy of the requested data (925).

Statement 4. An embodiment of the inventive concept includes a distributed storage system node (125, 130, 135) according to statement 1, wherein:

the I/O redirector (215) is operative to redirect a write request (1005) to a logging device (1015); and the I/O resynchronizer (220) is operative to replay any write requests (1005) from the logging device (1015).

Statement 5. An embodiment of the inventive concept includes a distributed storage system node (125, 130, 135) according to statement 4, wherein the I/O resynchronizer (220) is operative to replay (1110) any write requests (1005) stored at the logging device (1015) after the garbage collection event completes.

Statement 6. An embodiment of the inventive concept includes a distributed storage system node (125, 130, 135) according to statement 5, wherein the I/O resynchronizer (220) is operative to delete (1115) the write requests (1005) from the logging device (1015) after the write requests (1005) have been processed.

Statement 7. An embodiment of the inventive concept includes a distributed storage system node (125, 130, 135) according to statement 1, wherein:

the I/O redirector (215) is operative to redirect a write request (1005) to a second storage device (140, 145, 150, 155, 160, 165, 225, 230); and the I/O resynchronizer (220) is operative to replay any write requests (1005) from the second storage device (140, 145, 150, 155, 160, 165, 225, 230).

Statement 8. An embodiment of the inventive concept includes a distributed storage system node (125, 130, 135) according to statement 7, wherein the I/O redirector (215) is operative to redirect a write request (1005) to a second distributed storage system node (125, 130, 135) containing the second storage device (140, 145, 150, 155, 160, 165, 225, 230).

Statement 9. An embodiment of the inventive concept includes a distributed storage system node (125, 130, 135) according to statement 7, wherein the I/O resynchronizer (220) is operative to replay (1110) any write requests (1005) stored at the second storage device (140, 145, 150, 155, 160, 165, 225, 230) after the garbage collection event completes.

Statement 10. An embodiment of the inventive concept includes a distributed storage system node (125, 130, 135) according to statement 9, wherein the I/O resynchronizer (220) is operative to delete (1115) the write requests (1005) from the second storage device (140, 145, 150, 155, 160, 165, 225, 230) after the write requests (1005) have been processed.

Statement 11. An embodiment of the inventive concept includes a distributed storage system node (125, 130, 135) according to statement 1, wherein the I/O resynchronizer (220) is operative to copy any data (925) changed by the write requests (1005) from the second storage device (140, 145, 150, 155, 160, 165, 225, 230).

Statement 12. An embodiment of the inventive concept includes a distributed storage system node (125, 130, 135) according to statement 1, further comprising a logging device (1015) to store the write request (1005) redirected by the I/O redirector (215).

Statement 13. An embodiment of the inventive concept includes a distributed storage system node (125, 130, 135) according to statement 1, wherein the I/O resynchronizer (220) is operative to retrieve data (925) from replicated copies of data (925) on the selected storage device (140, 145, 150, 155, 160, 165, 225, 230).

Statement 14. An embodiment of the inventive concept includes a distributed storage system node (125, 130, 135) according to statement 1, wherein the device garbage collection monitor (205) includes a comparator (605) to compare the count (505, 510, 515, 520) of the free erase blocks on the at least one storage device (140, 145, 150, 155, 160, 165, 225, 230) with a free erase block threshold (610).

Statement 15. An embodiment of the inventive concept includes a distributed storage system node (125, 130, 135) according to statement 14, wherein the device garbage collection monitor (205) is operative to select the selected storage device (140, 145, 150, 155, 160, 165, 225, 230) when the count (505, 510, 515, 520) of the free erase blocks on the selected storage device (140, 145, 150, 155, 160, 165, 225, 230) is below the free erase block threshold (610).

Statement 16. An embodiment of the inventive concept includes a distributed storage system node (125, 130, 135) according to statement 1, wherein the device garbage collection monitor (205) is operative to receive the count (505, 510, 515, 520) of the free erase blocks from each of the storage devices (140, 145, 150, 155, 160, 165, 225, 230).

Statement 17. An embodiment of the inventive concept includes a distributed storage system node (125, 130, 135) according to statement 16, wherein the device garbage collection monitor (205) is operative to poll (525, 530, 535, 540) each of the storage devices (140, 145, 150, 155, 160, 165, 225, 230) for their count (505, 510, 515, 520) of the free erase blocks.

Statement 18. An embodiment of the inventive concept includes a distributed storage system node (125, 130, 135) according to statement 1, wherein the device garbage collection monitor (205) includes a time estimator (705) to estimate a time required (725) for the garbage collection event.

Statement 19. An embodiment of the inventive concept includes a distributed storage system node (125, 130, 135) according to statement 18, wherein the time estimator (705) is operative to estimate the time required (725) for the garbage collection event using at least one of an erase cycle time (710) for the selected storage device (140, 145, 150, 155, 160, 165, 225, 230), a time taken (715) for a prior garbage collection event, and an available capacity (720) of the storage device (140, 145, 150, 155, 160, 165, 225, 230).

Statement 20. An embodiment of the inventive concept includes a distributed storage system node (125, 130, 135) according to statement 18, wherein the garbage collection coordinator (210) is operative to inform at least one monitor (170, 175, 180) of an identifier (805) for the selected storage device (140, 145, 150, 155, 160, 165, 225, 230) and an estimated time required (725) for the garbage collection event.

Statement 21. An embodiment of the inventive concept includes a distributed storage system node (125, 130, 135) according to statement 20, wherein the garbage collection coordinator (210) is operative to inform (840) the at least one monitor (170, 175, 180) when the garbage collection event has completed.

Statement 22. An embodiment of the inventive concept includes a distributed storage system node (125, 130, 135) according to statement 20, wherein the garbage collection coordinator (210) is operative to schedule the selected storage device (140, 145, 150, 155, 160, 165, 225, 230) for the garbage collection event at a scheduled start time (810).

Statement 23. An embodiment of the inventive concept includes a distributed storage system node (125, 130, 135) according to statement 22, wherein the garbage collection coordinator (210) is operative to instruct (830) the selected storage device (140, 145, 150, 155, 160, 165, 225, 230) to begin the garbage collection event at the scheduled start time (810).

Statement 24. An embodiment of the inventive concept includes a distributed storage system node (125, 130, 135) according to statement 23, wherein:

the garbage collection coordinator (210) is operative to receive (815) from the at least one monitor (170, 175, 180) the scheduled start time (810) for the garbage collection event and a duration (820) for the garbage collection event; and the garbage collection coordinator (210) is operative to instruct the selected storage device (140, 145, 150, 155, 160, 165, 225, 230) to end the garbage collection event after the duration (820) has elapsed.

Statement 25. An embodiment of the inventive concept includes a distributed storage system node (125, 130, 135) according to statement 1, wherein the I/O redirector (215) is operative to identify the second storage device (140, 145, 150, 155, 160, 165, 225, 230) storing the replicated copy of the requested data (925).

Statement 26. An embodiment of the inventive concept includes a distributed storage system node (125, 130, 135) according to statement 1, wherein:

the I/O redirector (215) includes a map (920) to identify the second storage device (140, 145, 150, 155, 160, 165, 225, 230) storing a replicated copy of the requested data (925); and the I/O redirector (215) is operative to request the replicated copy of the requested data (925) from the second storage device (140, 145, 150, 155, 160, 165, 225, 230) and to respond to the read request (905) with the replicated copy of the requested data (925).

Statement 27. An embodiment of the inventive concept includes a distributed storage system node (125, 130, 135) according to statement 1, wherein:

the I/O redirector (215) is operative to identify the second storage device (140, 145, 150, 155, 160, 165, 225, 230) storing a replicated copy of the requested data (925) using a monitor (170, 175, 180); and the I/O redirector (215) is operative to request the replicated copy of the requested data (925) from the second storage device (140, 145, 150, 155, 160, 165, 225, 230) and to respond to the read request (905) with the replicated copy of the requested data (925).

Statement 28. An embodiment of the inventive concept includes a distributed storage system node (125, 130, 135) according to statement 1, wherein all of the storage devices (140, 145, 150, 155, 160, 165, 225, 230) are instructed not to perform garbage collection unless instructed by the garbage collection coordinator (210).

Statement 29. An embodiment of the inventive concept includes a monitor (170, 175, 180), comprising:

storage (1305) for a map (1310) of data across a network (120), the map (1310) including a count (1415, 1418, 1421, 1424) for each unit of data (1403, 1406, 1409, 1412) stored across the network (120);

a receiver (1320) to receive information about a storage device (140, 145, 150, 155, 160, 165, 225, 230) wanting to begin a garbage collection event; and a map updater (1325) to update the map (1310) of data across the network (120) as the storage device (140, 145, 150, 155, 160, 165, 225, 230) begins the garbage collection event and to further update the map (1310) of data across the network (120) as the storage device (140, 145, 150, 155, 160, 165, 225, 230) ends the garbage collection event.

Statement 30. An embodiment of the inventive concept includes a monitor (170, 175, 180) according to statement 29, wherein the storage device (140, 145, 150, 155, 160, 165, 225, 230) includes a Solid State Drive (SSD) (140, 145, 150, 155, 160, 165, 225, 230).

Statement 31. An embodiment of the inventive concept includes a monitor (170, 175, 180) according to statement 29, wherein the receiver (1320) is operative to receive an expected duration (820) for the garbage collection event on the storage device (140, 145, 150, 155, 160, 165, 225, 230).

Statement 32. An embodiment of the inventive concept includes a monitor (170, 175, 180) according to statement 31, wherein the receiver (1320) is operative to receive a scheduled start time (810) for the garbage collection event on the storage device (140, 145, 150, 155, 160, 165, 225, 230).

Statement 33. An embodiment of the inventive concept includes a monitor (170, 175, 180) according to statement 31, further comprising:

a scheduler (1330) to select a scheduled start time (810) for the garbage collection event on the storage device (140, 145, 150, 155, 160, 165, 225, 230); and a transmitter (1325) to transmit a scheduled start time (810) for the garbage collection event on the storage device (140, 145, 150, 155, 160, 165, 225, 230).

Statement 34. An embodiment of the inventive concept includes a monitor (170, 175, 180) according to statement 33, wherein the scheduler (1330) is operative to select the scheduled start time (810) to minimize unavailability of units of data (925) using the map (1310) of data across a network (120).

Statement 35. An embodiment of the inventive concept includes a monitor (170, 175, 180) according to statement 33, wherein the scheduler (1330) is operative to delay selecting the scheduled start time (810) for the garbage collection event on the storage device (140, 145, 150, 155, 160, 165, 225, 230) until the count (1415, 1418, 1421, 1424) for each unit of data (1403, 1406, 1409, 1412) is at least two.

Statement 36. An embodiment of the inventive concept includes a monitor (170, 175, 180) according to statement 35, wherein the storage (1305) is operative to store a waiting list (1315) to store the information about the storage device (140, 145, 150, 155, 160, 165, 225, 230) wanting to begin the garbage collection event if at least one unit of data (1403, 1406, 1409, 1412) stored on the storage device (140, 145, 150, 155, 160, 165, 225, 230) has a count (1415, 1418, 1421, 1424) of one.

Statement 37. An embodiment of the inventive concept includes a monitor (170, 175, 180) according to statement 33, wherein the monitor (170, 175, 180) is operative to work cooperatively with at least one additional monitor (170, 175, 180) to enable the scheduler (1330) to select the scheduled start time (810).

Statement 38. An embodiment of the inventive concept includes a method, comprising: selecting (1505) a storage device (140, 145, 150, 155, 160, 165, 225, 230) to begin a garbage collection event;
determining (1510) an estimated time required (725) for the selected storage device (140, 145, 150, 155, 160, 165, 225, 230) to perform the garbage collection event;
determining (1515) a scheduled start time (810) for the garbage collection event; and
instructing (1520) the selected storage device (140, 145, 150, 155, 160, 165, 225, 230), at the scheduled start time (810), to begin the garbage collection event.

Statement 39. An embodiment of the inventive concept includes a method according to statement 38, wherein:
selecting (1505) a storage device (140, 145, 150, 155, 160, 165, 225, 230) to begin a garbage collection event includes selecting (1505) a Solid State Drive (SSD) (140, 145, 150, 155, 160, 165, 225, 230) to begin the garbage collection event;
determining (1510) an estimated time required (725) for the selected storage device (140, 145, 150, 155, 160, 165, 225, 230) to perform the garbage collection event includes determining (1510) the estimated time required (725) for the selected SSD (140, 145, 150, 155, 160, 165, 225, 230) to perform the garbage collection event; and
instructing (1520) the selected storage device (140, 145, 150, 155, 160, 165, 225, 230), at the scheduled start time (810), to begin the garbage collection event includes instructing (1520) the selected SSD (140, 145, 150, 155, 160, 165, 225, 230), at the scheduled start time (810), to begin the garbage collection event.

Statement 40. An embodiment of the inventive concept includes a method according to statement 38, further comprising instructing (1540) the selected storage device (140, 145, 150, 155, 160, 165, 225, 230) to end the garbage collection event after a duration (820) has passed.

Statement 41. An embodiment of the inventive concept includes a method according to statement 38, wherein selecting (1505) a storage device (140, 145, 150, 155, 160, 165, 225, 230) to begin a garbage collection event includes:
determining (1605, 1610) a free erase block count (505, 510, 515, 520) for the selected storage device (140, 145, 150, 155, 160, 165, 225, 230);
comparing (1625) the free erase block count (505, 510, 515, 520) with a free erase block threshold (610); and
if the free erase block count (505, 510, 515, 520) is below the free erase block threshold (610), selecting (1635) the storage device (140, 145, 150, 155, 160, 165, 225, 230) to begin the garbage collection event.

Statement 42. An embodiment of the inventive concept includes a method according to statement 41, wherein determining (1605, 1610) a free erase block count (505, 510, 515, 520) for the selected storage device (140, 145, 150, 155, 160, 165, 225, 230) includes requesting (1605) the free erase block count (505, 510, 515, 520) from the selected storage device (140, 145, 150, 155, 160, 165, 225, 230).

Statement 43. An embodiment of the inventive concept includes a method according to statement 41, wherein:
determining (1605, 1610) a free erase block count (505, 510, 515, 520) for the selected storage device (140, 145, 150, 155, 160, 165, 225, 230) includes determining (1605, 1610) a free erase block count (505, 510, 515, 520) for each of a plurality of storage devices (140, 145, 150, 155, 160, 165, 225, 230);
comparing (1625) the free erase block count (505, 510, 515, 520) with a free erase block threshold (610) includes comparing (1625) the free erase block count (505, 510, 515, 520) for each of the plurality of storage devices (140, 145, 150, 155, 160, 165, 225, 230) with the free erase block threshold (610); and
selecting (1635) the storage device (140, 145, 150, 155, 160, 165, 225, 230) to begin the garbage collection event includes, if the free erase block count (505, 510, 515, 520) is below the free erase block threshold (610), selecting (1635) one of the plurality of storage devices (140, 145, 150, 155, 160, 165, 225, 230) with the lowest free erase block count (505, 510, 515, 520) to begin the garbage collection event.

Statement 44. An embodiment of the inventive concept includes a method according to statement 38, wherein determining (1510) an estimated time required (725) for the selected storage device (140, 145, 150, 155, 160, 165, 225, 230) to perform the garbage collection event includes determining (1510) the estimated time required (725) for the selected storage device (140, 145, 150, 155, 160, 165, 225, 230) to perform the garbage collection event using at least one of an erase cycle time (710) for the selected storage device (140, 145, 150, 155, 160, 165, 225, 230), a time taken (715) for a prior garbage collection event, and an available capacity (720) of the storage device (140, 145, 150, 155, 160, 165, 225, 230).

Statement 45. An embodiment of the inventive concept includes a method according to statement 38, wherein determining (1515) a scheduled start time (810) for the garbage collection event includes receiving (1725) the scheduled start time (810) from a monitor (170, 175, 180).

Statement 46. An embodiment of the inventive concept includes a method according to statement 45, wherein determining (1515) a scheduled start time (810) for the garbage collection event further includes receiving (1725) a duration (820) for the garbage collection event from the monitor (170, 175, 180).

Statement 47. An embodiment of the inventive concept includes a method according to statement 38, wherein determining (1515) a scheduled start time (810) for the garbage collection event includes informing (1710) a monitor (170, 175, 180) that the selected storage device (140, 145, 150, 155, 160, 165, 225, 230) needs the garbage collection event.

Statement 48. An embodiment of the inventive concept includes a method according to statement 38, further comprising redirecting (1525) a read request (905) away from the selected storage device (140, 145, 150, 155, 160, 165, 225, 230).

Statement 49. An embodiment of the inventive concept includes a method according to statement 48, wherein redirecting (1525) a read request (905) away from the selected storage device (140, 145, 150, 155, 160, 165, 225, 230) includes redirecting (1810) the read request (905) to a second storage device (140, 145, 150, 155, 160, 165, 225, 230) storing a replicated copy of requested data (925).

Statement 50. An embodiment of the inventive concept includes a method according to statement 49, wherein redirecting (1525) the read request (905) to a second storage device (140, 145, 150, 155, 160, 165, 225, 230) storing a replicated copy of requested data (925) includes redirecting (1525) the read request (905) to a distributed storage system node (125, 130, 135) containing the second storage device (140, 145, 150, 155, 160, 165, 225, 230) storing a replicated copy of requested data (925), the distributed storage system node (125, 130, 135) not containing the storage device (140, 145, 150, 155, 160, 165, 225, 230).

Statement 51. An embodiment of the inventive concept includes a method according to statement 48, wherein redirecting (1525) a read request (905) away from the selected storage device (140, 145, 150, 155, 160, 165, 225, 230) includes:

requesting (1815) a replicated copy of requested data (925) from a second storage device (140, 145, 150, 155, 160, 165, 225, 230) storing the replicated copy of the requested data (925); and responding (1820) to the read request (905) with the replicated copy of the requested data (925).

Statement 52. An embodiment of the inventive concept includes a method according to statement 38, further comprising redirecting (1530) a write request (1005) to a logging device (1015).

Statement 53. An embodiment of the inventive concept includes a method according to statement 52, further comprising replaying (1550) the write request (1005) stored in the logging device (1015) after the garbage collection event completes.

Statement 54. An embodiment of the inventive concept includes a method according to statement 53, further comprising deleting (1555) the write request (1005) from the logging device (1015) after the write request (1005) has been processed.

Statement 55. An embodiment of the inventive concept includes a method according to statement 38, further comprising redirecting (1530) a write request (1005) to a second storage device (140, 145, 150, 155, 160, 165, 225, 230).

Statement 56. An embodiment of the inventive concept includes a method according to statement 55, further comprising redirecting (1530) a write request (1005) to a distributed storage system node (125, 130, 135) containing the second storage device (140, 145, 150, 155, 160, 165, 225, 230), the distributed storage system node (125, 130, 135) not containing the storage device (140, 145, 150, 155, 160, 165, 225, 230).

Statement 57. An embodiment of the inventive concept includes a method according to statement 55, further comprising replaying (1550) the write request (1005) stored in the second storage device (140, 145, 150, 155, 160, 165, 225, 230) after the garbage collection event completes.

Statement 58. An embodiment of the inventive concept includes a method according to statement 57, further comprising deleting (1555) the write request (1005) from the second storage device (140, 145, 150, 155, 160, 165, 225, 230) after the write request (1005) has been processed.

Statement 59. An embodiment of the inventive concept includes a method according to statement 55, further comprising copying (1560) any data (925) changed by the write request (1005) from the second storage device (140, 145, 150, 155, 160, 165, 225, 230) after the garbage collection event completes.

Statement 60. An embodiment of the inventive concept includes a method, comprising:

receiving (2005) a notice that a storage device (140, 145, 150, 155, 160, 165, 225, 230) on a network (120) wants to begin a garbage collection event;

determining (2010) a scheduled start time (810) for the garbage collection event for the storage device (140, 145, 150, 155, 160, 165, 225, 230);

updating (2025) a map (1310) of data across the network (120) as the storage device (140, 145, 150, 155, 160, 165, 225, 230) begins the garbage collection event, the map (1310) including a count (1415, 1418, 1421, 1424) for each unit of data (1403, 1406, 1409, 1412) stored across the network (120); and updating (2030) the map (1310) of data across the network (120) as the storage device (140, 145, 150, 155, 160, 165, 225, 230) ends the garbage collection event.

Statement 61. An embodiment of the inventive concept includes a method according to statement 60, wherein:

receiving (2005) a notice that a storage device (140, 145, 150, 155, 160, 165, 225, 230) on a network (120) wants to begin a garbage collection event includes receiving (2005) the notice that a Solid State Drive (SSD) (140, 145, 150, 155, 160, 165, 225, 230) on the network (120) wants to begin the garbage collection event;

determining (2010) a scheduled start time (810) for the garbage collection event for the storage device (140, 145, 150, 155, 160, 165, 225, 230) includes determining (2010) the scheduled start time (810) for the garbage collection event for the SSD (140, 145, 150, 155, 160, 165, 225, 230);

updating (2025) a map (1310) of data across the network (120) as the storage device (140, 145, 150, 155, 160, 165, 225, 230) begins the garbage collection event, the map (1310) including a count (1415, 1418, 1421, 1424) for each unit of data (1403, 1406, 1409, 1412) stored across the network (120) includes updating (2025) the map (1310) of data across the network (120) as the SSD (140, 145, 150, 155, 160, 165, 225, 230) begins the garbage collection event; and updating (2030) the map (1310) of data across the network (120) as the storage device (140, 145, 150, 155, 160, 165, 225, 230) ends the garbage collection event includes updating (2030) the map (1310) of data across the network (120) as the SSD (140, 145, 150, 155, 160, 165, 225, 230) ends the garbage collection event.

Statement 62. An embodiment of the inventive concept includes a method according to statement 60, wherein receiving (2005) a notice that a storage device (140, 145, 150, 155, 160, 165, 225, 230) on a network (120) wants to begin a garbage collection event includes receiving (2205) the scheduled start time (810) in the notice that the storage device (140, 145, 150, 155, 160, 165, 225, 230) wants to begin the garbage collection event.

Statement 63. An embodiment of the inventive concept includes a method according to statement 60, wherein determining (2010) a scheduled start time (810) for the garbage collection even for the storage device (140, 145, 150, 155, 160, 165, 225, 230) includes determining (2220) the scheduled start time (810) for the garbage collection event for the storage device (140, 145, 150, 155, 160, 165, 225, 230) using the map (1310) of data across the network (120).

Statement 64. An embodiment of the inventive concept includes a method according to statement 63, wherein determining (2220) the scheduled start time (810) for the garbage collection event for the storage device (140, 145, 150, 155, 160, 165, 225, 230) using the map (1310) of data across the network (120) includes determining (2220) a plurality of scheduled start times (810) for garbage collection events for a plurality of storage devices (140, 145, 150, 155, 160, 165, 225, 230) using the map (1310) of data across the network (120).

Statement 65. An embodiment of the inventive concept includes a method according to statement 64, wherein determining (2220) the scheduled start time (810) for the garbage collection event for the storage device (140, 145, 150, 155, 160, 165, 225, 230) using the map (1310) of data across the network (120) includes scheduling (2220, 2235) no more than a predetermined percentage of the plurality of storage devices (140, 145, 150, 155, 160, 165, 225, 230) perform garbage collection at any time.

Statement 66. An embodiment of the inventive concept includes a method according to statement 63, wherein determining (2220) the scheduled start time (810) for the garbage collection event for the storage device (140, 145, 150, 155, 160, 165, 225, 230) using the map (1310) of data across the network (120) includes selecting (2220, 2230) the scheduled start time (810) to minimize unavailability of units of data (925) on the network (120).

Statement 67. An embodiment of the inventive concept includes a method according to statement 60, wherein updating (2025) a map (1310) of data across the network (120) as the storage device (140, 145, 150, 155, 160, 165, 225, 230) begins the garbage collection event includes decrementing (2105) a count (1415, 1418, 1421, 1424) for each unit of data (1403, 1406, 1409, 1412) stored on the storage device (140, 145, 150, 155, 160, 165, 225, 230).

Statement 68. An embodiment of the inventive concept includes a method according to statement 60, wherein updating (2030) the map (1310) of data across the network (120) as the storage device (140, 145, 150, 155, 160, 165, 225, 230) ends the garbage collection event includes incrementing (2110) a count (1415, 1418, 1421, 1424) for each unit of data (1403, 1406, 1409, 1412) stored on the storage device (140, 145, 150, 155, 160, 165, 225, 230).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A distributed storage system node, comprising:
   at least one storage device;
   a device garbage collection monitor to determine a count of free erase blocks on each of the storage devices, the device garbage collection monitor including:
      a receiver to receive the count of free erase blocks from the at least one storage device; and
      a comparator to compare the count of the free erase blocks on the at least one storage device with a free erase block threshold, wherein the device garbage collection monitor is operative to select a selected storage device of the at least one storage device when the count of the free erase blocks on the selected storage device is below the free erase block threshold;
   a garbage collection coordinator to schedule the garbage collection event on the selected storage device of the at least one storage device;
   an Input/Output (I/O) redirector to process a read request using a second storage device in a second distributed storage system node storing a replicated copy of the requested data and to redirect a write request; and
   an I/O resynchronizer to update the storage device to incorporate any write requests.

2. A distributed storage system node according to claim 1, further comprising a logging device to store the write request redirected by the I/O redirector.

3. A distributed storage system node according to claim 1, wherein:
   the I/O redirector is operative to redirect a write request to a third storage device in a third distributed storage system node; and
   the I/O resynchronizer is operative to replay any write requests from the third storage device.

4. A distributed storage system node according to claim 3, wherein the second distributed storage system node is the third distributed storage system node.

5. A distributed storage system node according to claim 1, wherein the device garbage collection monitor further includes a time estimator to estimate a time required for the garbage collection event.

6. A distributed storage system node according to claim 5, wherein the time estimator is operative to estimate the time required for the garbage collection event using at least one of an erase cycle time for the selected storage device, a time taken for a prior garbage collection event, and an available capacity of the storage device.

7. A distributed storage system node according to claim 5, wherein the garbage collection coordinator is operative to inform at least one monitor of an identifier for the selected storage device and an estimated time required for the garbage collection event.

8. A method, comprising:
   selecting a storage device in a distributed storage system node to begin a garbage collection event, including:
      determining a free erase block count for the selected storage device;
      comparing the free erase block count with a free erase block threshold; and
      if the free erase block count is below the free erase block threshold, selecting the storage device to begin the garbage collection event;
   determining an estimated time required for the selected storage device to perform the garbage collection event;
   determining a scheduled start time for the garbage collection event;
   instructing the selected storage device, at the scheduled start time, to begin the garbage collection event; and
   redirecting a write request to a second storage device in a second distributed storage system node.

9. A method according to claim 8, wherein determining an estimated time required for the selected storage device to perform the garbage collection event includes determining the estimated time required for the selected storage device to perform the garbage collection event using at least one of an erase cycle time for the selected storage device, a time taken for a prior garbage collection event, and an available capacity of the storage device.

10. A method according to claim 8, wherein determining a scheduled start time for the garbage collection event includes receiving the scheduled start time from a monitor.

11. A method according to claim 10, wherein determining a scheduled start time for the garbage collection event further includes receiving a duration for the garbage collection event from the monitor.

12. A method according to claim 8, further comprising redirecting a read request away from the selected storage device.

13. A method according to claim 12, wherein redirecting a read request away from the selected storage device includes redirecting the read request away from the selected storage device to a third storage device in a third distributed storage system node.

14. A method according to claim 8, further comprising redirecting a write request to a logging device.

15. A method, comprising:
 selecting a storage device in a distributed storage system node to begin a garbage collection event, including:
  determining a free erase block count for the selected storage device;
  comparing the free erase block count with a free erase block threshold; and
  if the free erase block count is below the free erase block threshold, selecting the storage device to begin the garbage collection event;
 determining an estimated time required for the selected storage device to perform the garbage collection event;
 determining a scheduled start time for the garbage collection event;
 instructing the selected storage device, at the scheduled start time, to begin the garbage collection event; and
 redirecting a read request away from the selected storage device to a second storage device in a second distributed storage system node.

16. A method according to claim 15, wherein determining an estimated time required for the selected storage device to perform the garbage collection event includes determining the estimated time required for the selected storage device to perform the garbage collection event using at least one of an erase cycle time for the selected storage device, a time taken for a prior garbage collection event, and an available capacity of the storage device.

17. A method according to claim 15, wherein determining a scheduled start time for the garbage collection event includes receiving the scheduled start time from a monitor.

18. A method according to claim 17, wherein determining a scheduled start time for the garbage collection event further includes receiving a duration for the garbage collection event from the monitor.

19. A method according to claim 15, further comprising redirecting a write request to a logging device.

* * * * *